United States Patent
Kvernvik et al.

(10) Patent No.: US 12,119,927 B2
(45) Date of Patent: *Oct. 15, 2024

(54) LINK ADAPTATION OPTIMIZATION WITH CONTEXTUAL BANDITS

(71) Applicant: Telefonaktiebolaget LM Ericsson (publ), Stockholm (SE)

(72) Inventors: Tor Kvernvik, Täby (SE); Henrik Nyberg, Stockholm (SE); Christian Skärby, Stockholm (SE); Raimundas Gaigalas, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 378 days.

This patent is subject to a terminal disclaimer.

(21) Appl. No.: 17/440,030

(22) PCT Filed: Mar. 18, 2019

(86) PCT No.: PCT/SE2019/050239
§ 371 (c)(1),
(2) Date: Sep. 16, 2021

(87) PCT Pub. No.: WO2020/190182
PCT Pub. Date: Sep. 24, 2020

(65) Prior Publication Data
US 2022/0182175 A1    Jun. 9, 2022

(51) Int. Cl.
*H04L 1/00* (2006.01)
*H04W 24/10* (2009.01)

(52) U.S. Cl.
CPC .......... *H04L 1/0026* (2013.01); *H04L 1/0034* (2013.01); *H04W 24/10* (2013.01)

(58) Field of Classification Search
CPC ..... H04L 1/0026; H04L 1/0034; H04W 24/10
(Continued)

(56) References Cited

U.S. PATENT DOCUMENTS

| | | | |
|---|---|---|---|
| 11,075,929 B1* | 7/2021 | Li | H04L 1/0003 |
| 2002/0072885 A1 | 6/2002 | Tang | |
| 2009/0103598 A1* | 4/2009 | Chuang | H04L 1/0009 375/346 |
| 2009/0286468 A1 | 11/2009 | Kim et al. | |
| 2010/0189075 A1 | 7/2010 | Iwamura et al. | |

(Continued)

OTHER PUBLICATIONS

International Search Report and Written Opinion dated Nov. 6, 2019 in International Application No. PCT/SE2019/050239 (14 pages total).

(Continued)

*Primary Examiner* — Obaidul Huq
(74) *Attorney, Agent, or Firm* — Rothwell, Figg, Ernst & Manbeck, P.C.

(57) ABSTRACT

Methods and systems for dynamically selecting a link adaptation policy, LAP. In some embodiments, the method includes using channel quality information, additional information, and a machine learning, ML, model to select a LAP from a set of predefined LAPs, the set of predefined LAPs comprising a first LAP and a second LAP. In some embodiments, the additional information comprises: neighbor cell information about a second cell served by a second TRP, distance information indicating a distance between a UE and a first TRP, and/or gain information indicating a radio propagation gain between the UE and the serving node. The method further includes the first TRP transmitting data to the UE using the selected LAP.

16 Claims, 19 Drawing Sheets

(58) Field of Classification Search
USPC .................................................. 370/310, 328
See application file for complete search history.

(56) References Cited

U.S. PATENT DOCUMENTS

| | | | |
|---|---|---|---|
| 2010/0317355 A1 | 12/2010 | Zangi et al. | |
| 2012/0106370 A1 | 5/2012 | Radulescu et al. | |
| 2012/0184220 A1* | 7/2012 | Zhang | H04L 1/20 455/39 |
| 2014/0064109 A1* | 3/2014 | Krishnamurthy | H04B 7/0456 370/252 |
| 2016/0156430 A1* | 6/2016 | Madan | H04L 1/0026 370/328 |
| 2017/0105210 A1 | 4/2017 | Mar et al. | |
| 2019/0052396 A1 | 2/2019 | Skärby | |
| 2019/0349905 A1* | 11/2019 | Matsuda | H04W 72/23 |
| 2020/0236559 A1 | 7/2020 | Spiotta et al. | |
| 2022/0149980 A1 | 5/2022 | Skärby et al. | |

OTHER PUBLICATIONS

International Search Report and Written Opinion dated Nov. 6, 2019 in International Application No. PCT/SE2019/050238 (13 pages total).

Saishankar, K.P. et al., "Reinforcement learning techniques for Outer Loop Link Adaptation in 4G/5G systems", ARXIV.org, Cornell University Library, Olin Library Cornell University, Ithaca, NY, arXiv; 1708.00994v1, Aug. 3, 2017, XP080951203 (26 pages total).

Auer, P. et al., "The Nonstochastic Multiarmed Bandit Problem", Society for Industrial and Applied Mathematics, 2002, vol. 32, No. 1, pp. 48-77 (30 pages total).

Allesiardo, R. et al., "A Neural Networks Committee for the Contextual Bandit Problem", Sep. 29, 2014, arXiv:1409.8191v1 (8 pages total).

Franzen, C., "Neural Networks for Contextual Multi-armed Bandits: Neural Bandit, a neural networks committee for the contextual bandit problem", May 9, 2017, The Wayback Machine, https://web.archive.org/web/20170810185447/http://charlesfranzen.com:80/posts/neural-networks-for-contextual-multi-armed-bandits/ (17 pages total).

Li, L. et al., "A Contextual-Bandit Approach to Personalized News Article Recommendation", WWW 2010, Full Paper, Apr. 26-30, Raleigh, NC USA (10 pages total).

Non-Final Office Action dated Dec. 7, 2023 in related U.S. Appl. No. 17/440,209 (16 pages).

Final Office Action dated May 10, 2024 in related U.S. Appl. No. 17/440,209 (18 pages).

* cited by examiner

Experiment with BLER(1)

Experiment with BLER(2)

⋮

Experiment with BLER(N)

LINK ADAPTATION OPTIMIZATION WITH CONTEXTUAL BANDITS

CROSS REFERENCE TO RELATED APPLICATION(S)

This application is a 35 U.S.C. § 371 National Stage of International Patent Application No. PCT/SE2019/050239, filed Mar. 18, 2019.

TECHNICAL FIELD

Disclosed are embodiments related to link adaptation optimization.

BACKGROUND

Link adaptation or rate adaptation is a known technique used in wireless telecommunication technologies with channel-dependent transmission such as High-Speed Downlink Packet Access (HSDPA), Long-Term Evolution (LTE) or New Radio (NR). To achieve very high data rates, link adaptation may adjust transmitted data packet size, MCS, and/or TBS at very short time periods (e.g., several milliseconds or even shorter) to the reported instantaneous channel quality for each receiving terminal.

Link adaptation relies on channel quality reports from a terminal (e.g., a User Equipment (UE)). However, channel quality reports are received with delays, which may depend on a terminal receiver type or systematic filtering by the terminals. Such delays introduce an error into the channel quality reports and uncertainty when selecting a data packet size for data transmission, which may result in suboptimal transmission performance.

Differences between the real and the reported channel quality may be particularly large in scenarios with rapidly varying channel conditions. Such scenarios are rather common and may occur due to, for example, certain radio environment conditions, a fast moving terminal or sudden changes in traffic in neighboring cells which may all result in rapidly varying inter-cell interference.

Hence, link adaptation needs to be adjusted to compensate for inaccurate channel quality reports in order to achieve data transmission with high performance.

SUMMARY

The target for data traffic is a high bitrate. Link adaption uses various transmission rates, corresponding to various combinations of coding and modulation (MCSs), to optimally adapt to current channel and interference conditions. The number of such transmission rates has increased in LTE and NR compared to HSDPA.

A well adopted link adaptation strategy is to try to maintain a certain rate of decoding errors. In the context of the current disclosure, the certain rate of decoding errors will be referred to as the Block Error Rate (BLER) and a target achievable BLER will be referred to hereinafter as the BLER target. Link adaptation for a UE has a desired BLER target depending on traffic type (e.g., data and voice) and QoS requirements.

For the purpose of explanation, let us assume that the BLER target corresponds to what the average user considers good transmission quality. If the BLER is below the BLER target, it is possible to save resources by decreasing the robustness of data transmission without sacrificing user experience. On the other hand, if the BLER is above the BLER target, the robustness of data transmission must be increased to achieve the desired user experience.

In conventional methods, a fixed common BLER target is frequently used for UEs with the same type of traffic and constant in time. The fixed BLER target is set such that optimal (high) bitrates may be provided in certain instances.

The fixed common BLER target, however, fails to provide optimal bitrates in non-stationary or rapidly varying channel conditions when combined with inaccurate channel quality reports. The fixed common BLER target may be considered as a fixed margin to adjust for the uncertainty in channel conditions. However, the fixed margin may not be ideal for situations when the error between the reported and real channel conditions is varying in an inhomogeneous way which may very well be the case when channel conditions are varying very rapidly.

Accordingly, using a fixed common BLER target may be particularly problematic in scenarios with rapidly varying inter-cell interference. In such scenarios, a fixed BLER target with a high value may be desirable for the UEs that experience such interference. However, setting a high value fixed BLER target for all UEs at all times will lead to substantially decreased throughput and spectral efficiency (SE). On the other hand, a fixed BLER target with a low value will lead to suboptimal performance for the UEs that are experiencing rapidly varying inter-cell interference.

Conventional methods of addressing the problem of inaccurate channel quality reports include dynamically adjusting the link adaptation policy based on an estimated uncertainty of the channel quality reports. Examples of such methods include setting a dynamic BLER target based on an estimated variance of the channel quality reports or adding an offset to the channel quality based on the observed HARQ BLER (the latter method is also referred to as CQI adjustment).

Such methods of dynamic adjustment, however, may face further implementation challenges. One problem is that channel quality reports are often systematically filtered by the terminals. In particular, fast channel variations are often filtered away and not reported by the terminals. Additionally, filtering may be different for different terminal types.

Another problem with such methods of dynamic adjustment is that even in instances in which an uncertainty of the channel quality report is estimated exactly, for example, in terms of variance measure, there is no straightforward way to incorporate the exact estimate into the link adaptation so that it would yield optimal transmission performance. A common strategy in such instances of higher uncertainty is to use higher transmitted packet sizes. The heuristics behind this common strategy is that, due to HARQ, if data is transmitted at a rate that is too high, nothing is really lost because the rate may be lowered afterwards. This however, may result in longer transmission times and even data packet losses.

Moreover, estimation of the uncertainty of the channel quality report has to be performed with rather short time constraints. Most of the data transmissions are known to be shorter than one second. Consequently, there is a high probability that the estimates may suffer high uncertainty.

Reconstructing fast channel quality variations removed by systematic terminal filtering has been addressed in a specific case of fast varying inter-cell interference. To gain knowledge about the channel variations that occur due to sudden traffic changes in the neighboring cells, base stations may report their scheduled instantaneous traffic activity to each other.

This approach introduces large amounts of time-critical signaling, which imposes a difficult challenge in terms of implementation. Under this approach, each cell has to report both its intended packet size to neighbor cells and to adjust that packet size according to the activity reports received from neighbor cells within the same transmission period. This requires an extremely fast communication channel between base stations in addition to extremely fast link adaptation implementation.

Other methods of link adaptation include applying a separate Machine Learning (ML) model per UE. In such methods, a cell needs to keep track of UE identity and store UE specific information. This method is problematic in that it will not scale for large networks due to memory limitations and the potential gain is limited since most UEs stay in one cell for a short period of time. An additional disadvantage may be a need to store large amounts of UE feedback and neighbor activity information.

One embodiment disclosed herein addresses at least the problems with conventional methods of link adaptation optimization discussed above. In some embodiments, a dynamic BLER target may be updated based on current channel conditions and/or neighbor cell interference. In some embodiments, a contextual bandit algorithm is used to select the BLER targets utilizing an online method. In such embodiments, a ML model used for selecting the BLER target is continuously updated to adapt to the current environment. In some embodiments, UE unique ML models are not required.

In an aspect, there is provided a method for dynamically selecting a link adaptation policy, LAP. The method includes a first transmission point, TRP, transmitting first data to a user equipment, UE, using a first LAP, wherein the first TRP serves at least a first cell. The method includes receiving a channel quality report transmitted by the UE, the channel quality report comprising channel quality information indicating a quality of a channel between the UE and the first TRP. The method includes obtaining additional information, wherein the additional information comprises: neighbor cell information about a second cell served by a second TRP, distance information indicating a distance between the UE and the first TRP (e.g., a timing advance, TA, indicator transmitted by the UE), and/or gain information indicating a radio propagation gain between the UE and the serving node (e.g., an average gain). The method includes using the channel quality information, the additional information, and a machine learning, ML, model to select a LAP from a set of predefined LAPs, the set of predefined LAPs comprising the first LAP and a second LAP. The method includes the first TRP transmitting second data to the UE using the selected LAP.

In some embodiments, the selected LAP indicates a block error rate (BLER) target and transmitting the second data to the UE using the selected LAP comprises transmitting the second data to the UE using the BLER target.

In some embodiments, transmitting the second data to the UE using the BLER target comprises selecting a transport block size, TBS, based on the BLER target and transmitting the second data to the UE using the selected TBS.

In some embodiments, the method includes generating the ML model, wherein generating the ML model comprises providing training data to an ML algorithm.

In some embodiments, selecting LAP from the set of predefined LAPs further comprises determining a first reward associated with the first LAP; determining a second reward associated with the second LAP; and determining a third reward associated with a third LAP, wherein the set of predefined LAPs further comprises the third LAP.

In some embodiments, selecting the LAP from the set of predefined LAPs comprises performing a first binomial (e.g., Bernoulli) trial, wherein a result of the first binomial trial consists of a first outcome or a second outcome, a first probability is assigned to the first outcome, and a second probability is assigned to the second outcome.

In some embodiments, selecting the LAP from the set of predefined LAPs further comprises selecting the first reward, the second reward or the third reward based on the result of the first binomial trial, thereby selecting the first LAP associated with the first reward, the second LAP associated with the second reward or the third LAP associated with the third reward.

In some embodiments, selecting the first reward, the second reward or the third reward based on the result of the first binomial trial comprises selecting the first reward when the result of the first binomial trial is the first outcome (exploitation mode); and randomly selecting the second reward or the third reward when the result of the first binomial trial is the second outcome (exploration mode), wherein the first reward is higher than the second reward and the third reward.

In some embodiments, selecting the LAP from the set of predefined LAPs further comprises performing a second binomial trial, wherein a result of the second binomial trial consists of the first outcome or the second outcome, and wherein performing the second binomial trial comprises obtaining an annealing probability value; increasing the first probability by the annealing probability value to obtain an updated first probability; reducing the second probability by the annealing probability value to obtain an updated second probability; assigning the updated first probability to the first outcome; and assigning the updated second probability to the second outcome.

In some embodiments, selecting the LAP from the set of predefined LAPs further comprises selecting the first reward, the second reward or the third reward based on the result of the second binomial trial, thereby selecting the first LAP associated with the first reward, the second LAP associated with the second reward or the third LAP associated with the third reward.

In some embodiments, the first reward comprises a first spectral efficiency, the second reward comprises a second spectral efficiency, and the third reward comprises a third spectral efficiency.

In some embodiments, the method includes providing training data to the ML algorithm based on the transmitted second data to the UE using the selected LAP.

In some embodiments, the additional information further comprises neighbor cell information about a third cell served by a third TRP.

In some embodiments, selecting the LAP from the set of predefined LAPs comprises utilizing an epsilon-greedy arm selection algorithm, an upper confidence bounds (UCB) algorithm, and/or a Thompson sampling algorithm.

In another aspect, there is provided a computer program comprising instructions which, when executed by processing circuitry, causes the processing circuitry to perform any of the methods described above.

In another aspect, there is provided a first transmission point (TRP) adapted to perform any of the method described above.

An advantage provided by the embodiments disclosed herein includes improved spectrum efficiency compared to the conventional methods of link adaptation optimization.

Some advantages provided by the embodiments disclosed herein include the use of the ML algorithm which is able to reconstruct information missing from channel quality reports based on relevant additional measurements and to implicitly incorporate the reconstructed information into the mapping of input time series to an optimal policy for the upcoming time period.

This is in contrast to existing conventional methods which only try to measure the uncertainty of the channel quality reports, such as, for example, dynamic BLER target based on variance of channel quality reports. By reconstructing the missing information, the embodiments disclosed herein achieves better performance.

The embodiments disclosed herein also have an advantage over the existing conventional methods which incorporate additional measurements by explicit algorithms such as dynamic offset to the channel quality based on the observed HARQ BLER (CQI Adjustment). One embodiment utilizes a ML algorithm which maps the observed time series of the channel quality reports and additional measurements directly to the predicted optimal policy. Hence, the ML algorithm can learn more advanced highly non-linear policies which cannot possibly be described by an explicit algorithm. Moreover, the ML algorithm can be trained to mimic traditional algorithms.

In some embodiments, a same ML model is used for all UEs served by a same cell. Accordingly, a UE unique ML model is not required and a new UE that enters a cell will be able to reuse the knowledge that has been learnt from other UEs that have previously entered the cell. This provides the advantage of significantly reducing the need (or removing the need entirely) to store any UE specific information in the radio base station (RBS), thereby enabling efficient use of memory.

In some embodiments, on-line ML is utilized. Compared to off-line (supervised) training, on-line ML requires less manual work and ML models are continuously updated without any human interaction.

Listed below are two options regarding how to implement off-line learning:

(1) "One size fits all" option—this option provides one generic model used for all networks by collecting or synthetically generating data for different types of network scenarios. Some problems with this option may include reduced accuracy for unexpected scenarios.

(2) Unique ML models for different network scenarios—this option increases life cycle management cost in order to maintain multiple models and to retrain the models as the networks are updated.

Listed below are two options regarding how to implement on-line learning:

(1) Dynamic BLER target selection is realized as a contextual multi-armed bandit algorithm where each arm (or action), out of n available arms, represents a specific BLER target, out of n available BLER targets. A ML model uses a number of input features to select an estimated best arm given the input. In some embodiments, the estimated best arm may indicate the best BLER target. The ML model is updated repeatedly, using a context comprising the same set of input features used to make a decision, together with an observation of the actual outcome ("reward") of the decision.

(2) Dynamic BLER selection is realized as a two-armed bandit, where a first arm represents using a pre-trained (supervised) ML model that uses a number of input features to select the best BLER. This second option may be considered as an off-line trained version of the first option. A second arm represents an alternative solution, for example, a fallback solution such as a fixed BLER target. The fall back solution is intended to be used only in scenarios when the primary solution, the first arm representing the pre-trained ML model, is not performing as expected. The two-armed bandit may be context-less, a classical multi-armed bandit (MAB), or contextual. The context-less or classical MAB approach only needs feedback in the form of a "reward" per action, as will be described in further detail below. In some embodiments, the reward per action may be a BLER target choice.

Some embodiments disclosed herein enable dynamically updating a BLER target in order to maximize the SE for a current channel status and interference level from the neighbor cells. Off-line training of the model is not required. Accordingly, some embodiments disclosed herein enable successful handling of changes in the environment, i.e. concept drifts. In some embodiments, one ML model is used for all UEs in the same cell, thereby allowing new UEs entering the cell to be able to reuse the knowledge that has been learnt from other UEs that have previously entered the cell. This allows scalability because only one ML model is stored per cell. In some embodiments, online machine learning is utilized to dynamically update the BLER target which considers context when selecting BLER target with a contextual bandit algorithm for the BLER target selection.

BRIEF DESCRIPTION OF THE DRAWINGS

The accompanying drawings, which are incorporated herein and form part of the specification, illustrate various embodiments.

DETAILED DESCRIPTION

Figure 1:
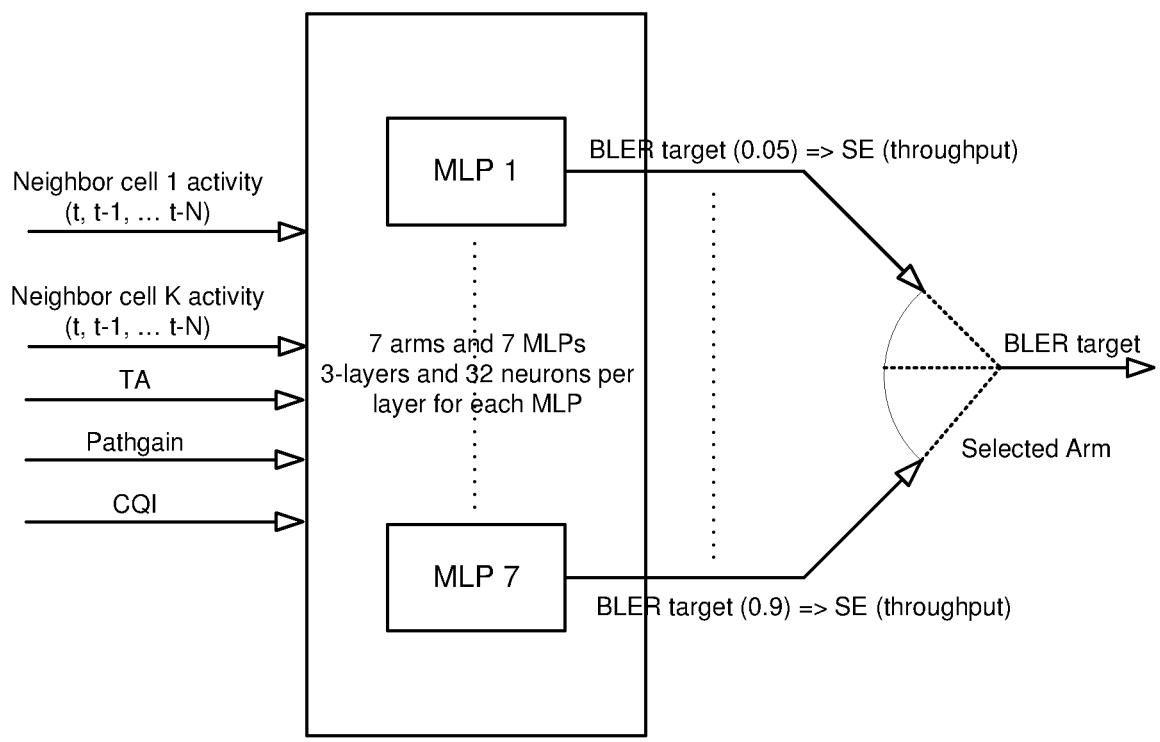
FIG. 1 illustrates a Machine Learning model according to one embodiment.

In some embodiments, there is provided a machine learning-optimized dynamic BLER target selection. In some embodiments, link adaptation is deployed with a dynamic BLER target set for each individual UE for a short period of time, e.g., a period of sub-seconds, and a contextual bandit algorithm with a Machine Learning (ML) algorithm selects the BLER target. The ML algorithm considers channel quality reports along with additional measurements, such as, for example, neighbor cell activity, path gain to the serving cell, and time alignment information when selecting the BLER target.

In some embodiments, the contextual bandit algorithm with the ML algorithm is trained to map time series of observations of channel quality reports and time series observations of additional measurements obtained during a historic period of data transmission time to the optimal BLER target for an upcoming period of data transmission time in the future.

It is assumed that RBSs can report neighbor cell scheduling activity to each other via communication links. Examples of such communication links include a X2 interface in LTE, a Xn interface in NR or a combined Iub-Iur interface in HDSPA.

We now consider an exemplary scenario where there exists rapidly varying downlink (DL) inter-cell interference to describe the embodiments disclosed herein. The embodiments disclosed herein may be particularly beneficial in this exemplary scenario. Rapidly varying DL inter-cell interference may be rather common in LTE, NR, HSDPA or other wireless communication technologies with non-orthogonal DL transmissions. However, the exemplary scenario is in no way limiting and the embodiments disclosed herein may be applied to various alternative scenarios.

Let us now consider a UE running a common Internet application such as world-wide-web, video or social media service and receiving data in DL from a RBS for a relatively long time, for example, several seconds or minutes. While the number of active UEs in wireless networks is quite large, the majority of the active UE connections are short and devoted to multiple transmissions including a small number of data packets. This is because the majority of smartphone applications transmit small amounts of data in short bursts.

Accordingly, there is a high probability that the considered active UE in a cell and the majority of other active UEs in neighboring cells with Internet traffic are each active for short time periods. This results in rapidly varying resource allocation in the neighboring cells. Hence, the considered active UE will experience rapidly varying inter-cell interference.

In some embodiments, there is provided an online machine learning algorithm based on a contextual multi-armed bandit (hereinafter referred to as the "online ML model"). It is assumed that there is an optimal BLER target that will result in a maximal throughput, i.e., optimal Spectral Efficiency (SE). The optimal BLER target varies with changes in interference load and the radio environment. Some embodiments are directed to selecting a BLER target as close as possible to the optimal BLER target for each data transmission time period. The duration or frequency of BLER selection may be chosen flexibly, but the period should be short enough to sufficiently follow significant changes of neighbor cell activity and radio environment statistics. In some embodiments, a number of discrete values of BLER targets are configured. As shown in an embodiment described in further detail below with reference to FIG. 1, each discrete value of the BLER targets is represented with one arm and there is a separate ML model associated to each arm.

In some embodiments, the online ML model is a regression (non-linear) model that predicts an expected reward from observable data. The online ML model may be trained using a contextual bandit algorithm.

In one embodiment, the contextual bandit algorithm utilizes an epsilon-greedy arm selection which works by letting each arm predict a reward based on an observed context. In other embodiments, the contextual bandit algorithm may utilize other algorithms such as upper confidence bounds (UCB) and Thompson sampling, among others. Accordingly, there may be a probability that the arm that is predicted to be the best arm is selected and, in the remaining probability, that a random arm is selected. An exemplary algorithm of the contextual bandit algorithm utilizing the epsilon-greedy arm selection is shown below:

--- initialize a multilayer perceptron A_k for each action in action set K
choose exploration parameter epsilon
for t = 1, 2, ..., T:
  observe context x_t
  for k in K:
    predict y_k from x_t using A_k
  perform a Bernoulli trial with success probability epsilon
  if success:
    pull the best arm. The best arm is selected based on the prediction
    along with the rewards of the arms pulled in the past.
  else
    play a random arm
  perform a training step on the arm played

---

FIG. 1 shows an online ML model according to one embodiment. In most conventional methods, the BLER target is configured via parameters and is not updated during operation. The online ML model as disclosed herein replaces the current fixed value of BLER target with a dynamically updated BLER target during operation. As shown in FIG. 1, a contextual bandit algorithm is used in the online ML model. BLER target values are selected to maximize the reward based on current channel conditions and the context of the network environment, e.g., interference level from neighbor cells. The context of the network environment may be based on neighbor cell activity, path gain to the serving cell, timing advance information, and possibly other measurements.

Each time a new BLER target is to be selected, the BLER selection sequence described below is performed. In some embodiments, a RBS is configured to determine how often a new BLER target is selected. In some embodiments, a cell is configured to determin how often a new BLER target is selected.

As shown in the BLER selection sequence below, an arm is pulled for each BLER selection and a reward is received. The sequence shows how the online ML model is updated and the BLER target selection is performed simultaneously in an online fashion.

```
Initialize one Multilayer Perceptron (MLP) for each BLER target.
Choose exploration parameter balancing exploration and exploitation
For each time step t in 1,2,..T:
    Observe context x_t
    For each arm:
        predict the reward i.e. SE(Throughout)
        perform a Bernoulli trial with success probability epsilon
        if success:
            pull arm with the highest predicted reward
        else
            play random arm.
        Perform a training step on the pulled arm
```

As shown in FIG. 1, the exemplary online ML model includes seven Multilayer Perceptrons (MLPs) and seven arms. Each MLP may have three layers and there may be 32 neurons per layer for each MLP. As shown in FIG. 1, there may be one BLER target output for the seven MLPs. In some alternative embodiments, the online ML model includes a plurality of MLPs and a plurality of BLER target outputs. In other embodiments, the online ML model includes a single MLP and a plurality of BLER target outputs.

As shown in FIG. 1, a contextual bandit algorithm is used to select which arm to pull next in order to maximize the return. The achieved SE (throughput) for each pull is used as the reward. An exploration parameter is chosen such that the contextual bandit algorithm performs a trade-off between an exploitation mode and an exploration mode. The exploration parameter determines the probability of whether the next arm will be selected in the exploitation mode or the exploration mode. When in exploitation mode, the arm that is predicted to give the highest reward is selected. When in exploration mode, any one of the other arms is selected (e.g., randomly selected). In the start phase of the online ML model, the exploration parameter is set at a high value which increases the probability of the contextual bandit algorithm performing in exploration mode. This allows the increased use of the exploration mode (compared to the exploitation mode) in order to learn which arm maximizes the reward for each context. As the online ML model progressively gets more accurate, the exploitation mode is used more often—the exploration parameter is gradually decreased. However, a minimum probability of using the exploration mode is required to handle changes in the environment i.e. concept drift. In some embodiments, the training of the MLP models is performed by minimizing a loss function of the prediction error.

In some embodiments, input measurements fed into the MLPs may be derived from a number of features that the RBS continuously collects. As shown in FIG. 1, the input measurements may include the following:

(1) Channel Quality Indicator (CQI)—reflects the current average channel quality (average over the time step duration) and is continuously received from each connected UE. The CQI is an important input to the BLER target selection. A high CQI value indicates that a low BLER target can be selected.
(2) Timing Advance (TA)—provides an indication of the distance from the a serving transmission point (e.g., serving RBS) for each UE. A TA value is received from the UE at regular intervals.
(3) Neighbor cell activity—provides a value of the current traffic load in the neighbor cells. A high value indicates that there will be a lot of interference and that a high BLER target shall be selected.
(4) Pathgain between the UE to serving RBS—measures the average radio propagation gain between the UE and the serving node.

In some embodiments, the online ML model utilizes informative rewards. The reward corresponding to each arm (each possible choice) should reflect the benefit of choosing a specific arm given a specific input. In order for the online ML method to learn as quickly as possible, informative feedback is important. For example, the chosen reward may be the spectral efficiency obtained for a particular input. Using the spectral efficiency as a reward provides more information than, for example, indicating the reward as equal to 1 if the contextual bandit algorithm has made a best choice and 0 otherwise.

In some embodiments, the selection of such informative rewards facilitates basic ML model training by offline supervised learning before deployment and online training (also referred to as a warm start). For example, the ML model may be pre-trained using offline supervised learning before it is used in the contextual bandit algorithm.

Figure 2:
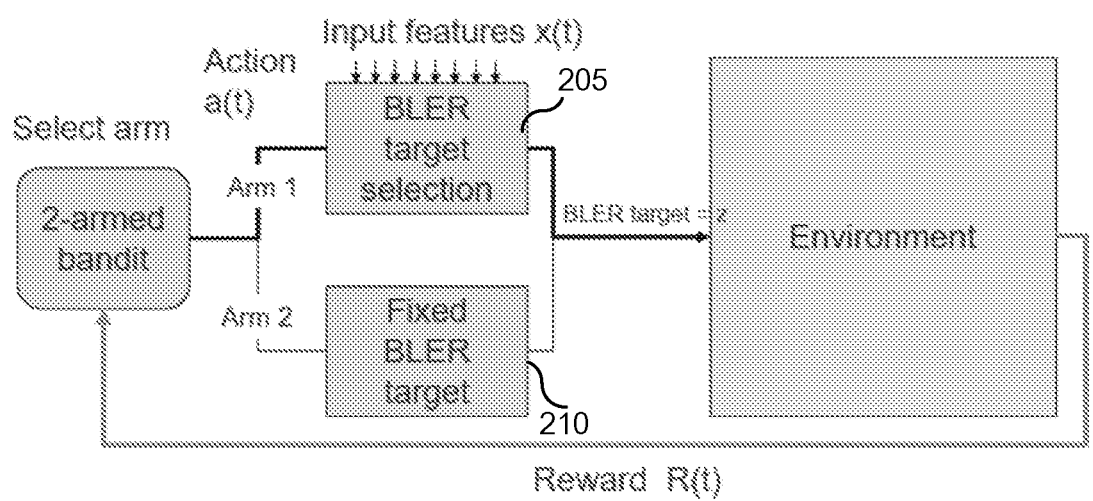
FIG. 2 illustrates a Machine Learning model according to one embodiment.

In some embodiments, the online ML method comprises a two-armed bandit method. The two-armed bandit method provides an efficient way to select between two DL link adaptation methods. FIG. 2 shows a two-armed bandit with on-line training, where the two-armed bandit chooses between a general solution and a fallback solution (also referred to as a legacy solution). The two-armed bandit ensures that performance will always be at least as good as the fallback solution.

In some embodiments, the general solution may be a pre-trained BLER selection model and the fallback solution may be a fixed BLER target, as shown in FIG. 2. In some embodiments, the fixed BLER target is BLER target 10%.

In some embodiments, the arm selection for the two-armed bandit is controlled by an exploration versus exploitation process (e.g., choosing the exploration parameter) as described above. This means that most of the time during normal operation, i.e. exploitation, the general solution, e.g., BLER target selection 205, will be selected. During exploration, the general solution or the fallback solution may be randomly selected. In some embodiments, fixed BLER target 210 is the fallback solution. In some alternative embodiments, the fallback solution or the general solution may be selected during exploration depending on what solution is selected for exploitation. For example, if the general solution is selected for exploitation, then the fallback solution is selected for exploration. Similarly, if the fallback solution is selected for exploitation, then the general solution is selected for exploration. In some embodiments, the spectral efficiency is fed back to the two-armed bandit as a reward.

In some embodiments, the two-armed bandit is a stochastic bandit with no input features, for example, input features x(t) shown in FIG. 2. Due to the absence of input features in the stochastic bandit, the arm selection is only dependent on the reward. In some embodiments, the two-armed bandit is a contextual bandit algorithm which utilizes network context information based on input measurements (e.g., input features x(t)) obtained by the RBS for the arm selection.

In real-world deployment, there is a need to cover several different scenarios depending on various network situations. In some embodiments, there are provided three components: (A) a general solution, (B) a fallback solution, and (C) a local adaptation solution. In some embodiments, the fallback solution may be useful in combination with the general solution. This combination may be used in special cases. For example, the fallback solution is used when the general solution fails in unfamiliar environments.

The three components are described in further detail below.

(A) The general solution is based on a general common model that is suitable for all networks and cells. In some embodiments, the general solution is trained on batches of data from a number of different types of networks. The data may be either artificially generated or collected from network operators.

Figure 3:
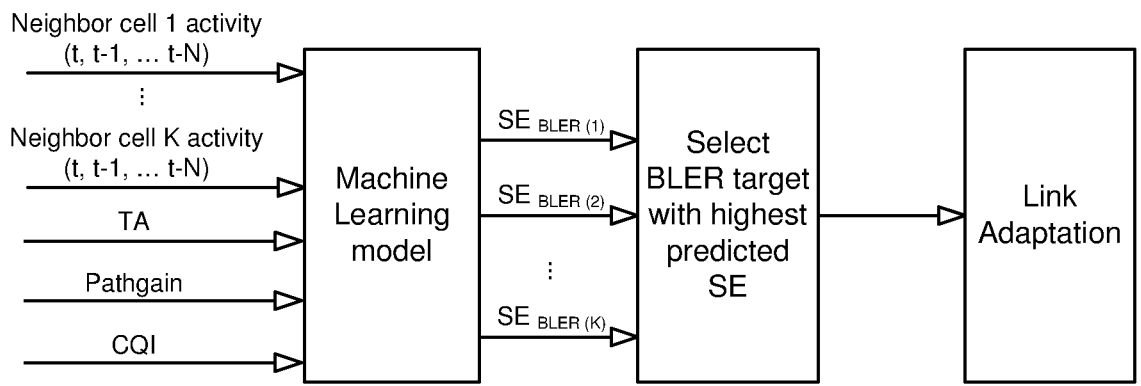
FIG. 3 illustrates a Machine Learning model according to one embodiment.

In some embodiments, the general solution comprises a ML model pre-trained off-line (hereinafter referred to as the "supervised ML model"), as shown in FIG. 3.

FIG. 3 illustrates a procedure in which the supervised ML model is used to select a close-to-optimal BLER target. This procedure is described in further detail below with reference to FIG. 3.

In some embodiments, a range of possible BLER targets is chosen. For example, the range of possible BLER targets may be limited to a finite set: $\{BLER_1, BLER_2, \ldots, BLER_K\}$. The ML model selects one of the possible BLER targets as a close-to-optimal BLER target for the considered UE during the upcoming data transmission time period.

As shown in FIG. 3, input measurements for the ML model are collected, fed into the ML model, and the ML model outputs are collected at each data transmission time period. The input measurements describe the considered UE's radio environment variation at some historical time period. In some embodiments, the input measurements may include: (1) resource utilization in a number of neighbor cells; (2) channel quality reports (e.g., Channel Quality Indicator (CQI)); (3) path gain to the serving cell; (4) timing advance to the serving cell; and other relevant measurements. The resource utilization may be indicated by a vector with historical data (e.g., Neighbor cell 1 activity at times (t, t–1, . . . t–N), . . . , Neighbor cell M activity at times (t, t–1, . . . t–N)). The timing advance may provide an indication of the distance from the cell center of the serving cell for each UE.

The ML model uses the input measurements to predict the performance of the DL data transmissions to the considered UE in the upcoming data transmission time period for each of the BLER targets in the chosen set of BLER targets based on the current interference pattern. The ML model outputs the predicted performance for each of the BLER targets. For example, the predicted performance for each of the BLER targets may be indicated as Spectral Efficiency: $\{SE(BLER_1), SE(BLER_2), \ldots, SE(BLER_K)\}$. In some embodiments, a plurality of ML models may use the input measurements to predict the performance of the DL data transmissions to the considered UE and output the predicted performance.

As shown in FIG. 3, the BLER value with highest predicted performance is selected as the BLER target for the upcoming period.

In some embodiments, the procedure for using ML model to select a close-to-optimal BLER target comprises: (1) collect input measurements for a current data transmission period; (2) feed the collected input measurements into the ML model and obtain the predicted performance for the possible BLER targets in a chosen set of BLER targets for the next data transmission period; and (3) select the BLER target with highest predicted performance. In some embodiments, the obtained predicted performance for the possible BLER targets may indicated as $SE(BLER_1), SE(BLER_2), \ldots, SE(BLER_K)$. In some embodiments, selecting the BLER target with the highest predicted performance may be shown as $BLER_{target} = \text{argmax}_k SE(BLER_k)$.

As shown in FIG. 3, the selected BLER target is passed into DL link adaptation. The selected BLER target is used for link adaptation during the next update period to select close-to-optimal transport block sizes. In some embodiments, transport block sizes are selected at shorter time periods (e.g., several ms or shorter) than the BLER target (e.g., 10-1000 ms).

In some embodiments, the ML model for the BLER target selection is obtained based on supervised learning. Supervised learning is a way to build a mathematical model by estimating the relation between a number of known input and known output examples.

In some embodiments, a procedure of supervised learning starts by collecting the input and output sample pairs from a target environment. In some embodiments, the input and output sample pairs from the target environment may be based on synthetic data from a simulated version of a real target environment. Then, a suitable function with possibly random parameters is chosen as an initial model. This is followed by a "training" procedure where the collected input samples are fed into the function and its parameters are gradually adjusted to produce outputs that are as close as possible to the desired output samples. The model is considered to be sufficiently well trained when the model produces outputs that are close enough to the desired output set for a given test set of inputs that have not been used for training.

Some non-limiting examples of functions used for supervised learning include artificial neural networks and decision trees.

Some exemplary ML model configurations for BLER target selection are now described. Let us consider an embodiment in which dynamic BLER target is used for a UE experiencing rapidly varying inter-cell interference from neighbor cells and the ML model for BLER target selection comprises the structure shown in FIG. 1 and further described in related description. It is assumed that a finite set of possible BLER targets is chosen $\{BLER_1, BLER_2, \ldots, BLER_K\}$. Accordingly, the ML model (or a plurality of ML models) predicts spectral efficiency values $\{SE(BLER_1), SE(BLER_2), \ldots, SE(BLER_K)\}$ in the upcoming data transmission period for each of the BLER targets in the set.

Figure 4:
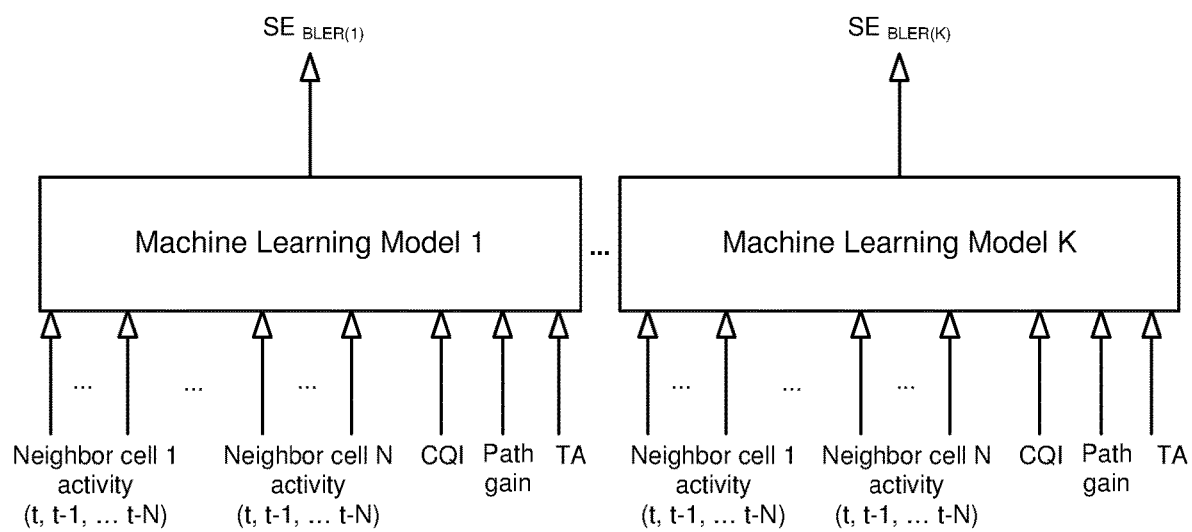
FIG. 4 shows plurality of Machine Learning models for BLER target selection according to one embodiment.
Figure 5:
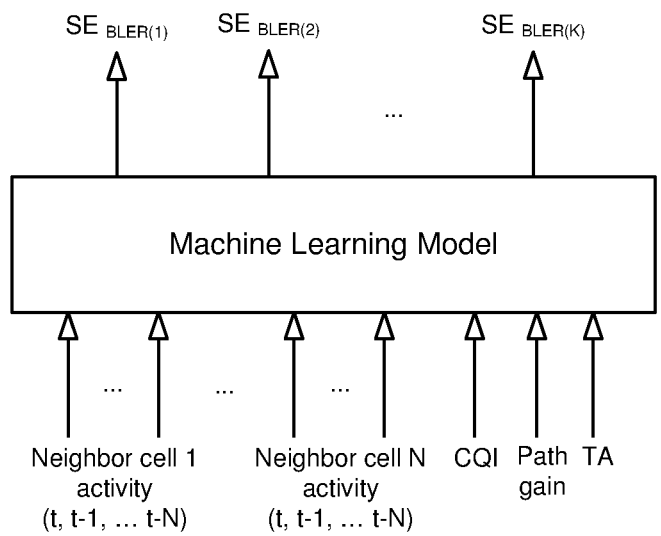
FIG. 5 shows a Machine Learning model with multiple outputs for BLER target selection according to one embodiment.
Figure 6:
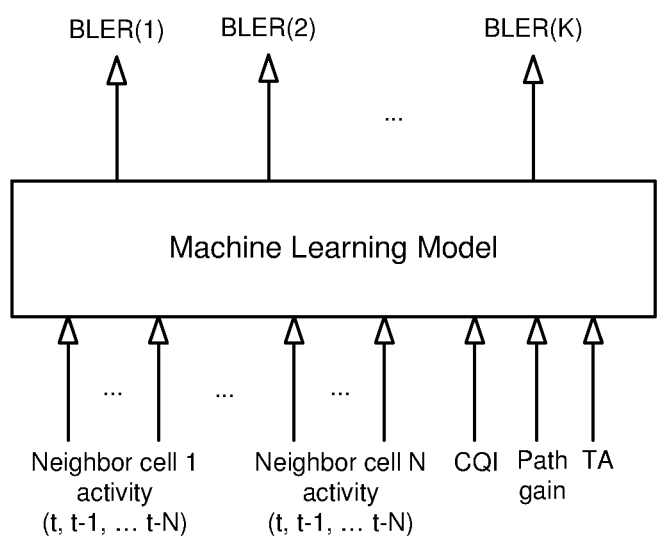
FIG. 6 shows a Machine Learning classifier for BLER target selection according to one embodiment.

Some possible ML model configurations for BLER target selection in this embodiment includes, but is not limited to, the following:

1. A plurality of ML models with a single output for spectral efficiency. As shown in FIG. 4, a set of ML models is trained, where the set includes one ML model for each BLER target. Each ML model has the same inputs as described above and one output for spectral efficiency for the corresponding BLER target.
2. One ML model with multiple outputs for spectral efficiency. As shown in FIG. 5, one common ML model is trained, with multiple outputs, where each output predicts spectral efficiency for one BLER target in the set.
3. One model with multiple outputs for BLER target selection. As shown in FIG. 6, one common ML model is trained, with multiple outputs, where each output predicts a probability for each BLER target in the set for being the optimal BLER target.

Referring back to the remaining two components:
(B) The fallback solution is able to detect when the general solutions fails. As described above, the fallback may be a legacy solution.
(C) The local adaptation solution collects local data and is trained on-line. In the local adaptation solution, each cell has a unique model. The local adaptation may comprise embodiments of the online ML method disclosed herein.

Data Simulation for the Online ML Method

Figure 7:
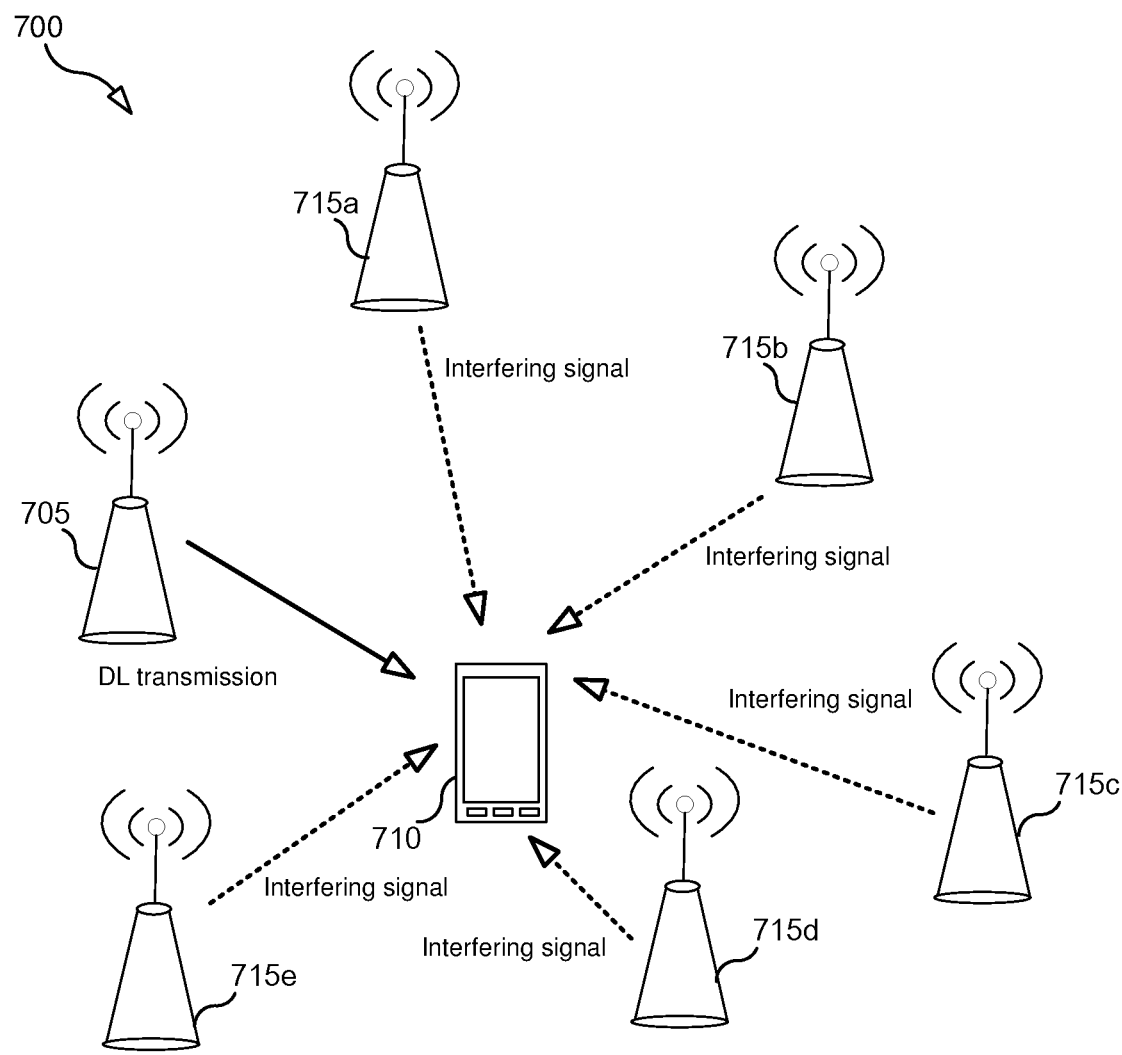
FIG. 7 shows a network environment according to one embodiment.

Two data sets were simulated in order to evaluate the online ML method disclosed herein. For the online method simulation, a first cell 705 is modelled in detail with basic DL link adaptation functionality, as shown in FIG. 7. The first cell 705 has a number of neighbor cells ("interferers") 715a-e placed in a grid. Each neighbor cell transmits with a certain probability at each transmission time interval (TTI).

A full buffer scenario is assumed for the simulation and the generated data is in the form of a time-series with additional content for each 100 ms. The additional content is listed with detail below:
 (1) The load of each neighbor cell with values for each ms for the last 100 ms. The load is normalized to a value between 0 and 1. The reason for having the historical values is because these values are not UE specific, i.e. the values describe the state of the cell. The load each neighbor cells may describe the state of the cell and historical values may facilitate the prediction of the next values. In this particular simulation, a mean value and standard deviation for the last 100 ms was used
 (2) SINR/CQI for the UE. For simplicity the SINR was simulated. The SINR provides an accurate depiction of the CQI as the SINR is closely correlated the CQI.
 (3) Distance/Timing Advance (TA). The distance between the UE and the cell center was simulated, which is closely correlated with the TA.
 (4) The throughput for each BLER target was provided as [0.05,0.1,0.2,0.3,0.5,0.7,0.9]. SE was generated for all BLER targets for each context to enable exploration. This makes it possible to get the optimal BLER target for each step and lets the bandit explore any BLER target at each step. The throughput from the optimal BLER target is hereinafter referred to as "genie" in the results below.

The output of the data is a time series with one row per 100 ms. Table 1 below shows an example of a subset of one row.

during the simulation is between "exploitation" of the arm that has the highest expected payoff and "exploration" to get more information about the expected payoffs of the other arms.

During the initial start, the weights of the MLP models are not optimal. In case of a "cold start," the values may be set to random values and. In the case of a "warm start," the values may be derived from other RBSs or set to some standard values derived from a trained model. In either case, the weights in the models need to be trained to converge to an optimal solution. Additionally, the models need to be updated continuously as the environment is modified.

In case of exploitation the arm (e.g., BLER target) that is predicted to give the highest SE is selected (also referred to as "exploitation mode") and in the case of exploration any another arm is randomly selected (also referred to as "exploration mode"). The ratio between exploration and exploitation is high at the beginning, meaning there will be more exploration than exploitation, and is gradually reduced during time as the models are trained. Since the environment may change during the entire life time of the network there will always be required a minimum amount of exploration.

In some embodiments, an Epsilon annealing algorithm may be used for the ratio between the exploration and exploitation. As an example, the following parameters may be utilized to set the ratio between exploration and exploitation: max_explore e.g.=0.9; exp_annealing_rate e.g. 0.9991; and min_explore e.g. 0.05.

The algorithm starts with a maximum exploration rate (e.g., max_explore). The exp_annealing_rate indicates the pace at which the exploration rate decreases and min_explore indicates the minimum exploration that is used to adapt to concept drifts.

Concept drifts are variations in the environment other than the normal weakly/daily variations. For example, changes in network configurations, changes in the physical environment, and changes in the end user traffic characteristics. Changes in network configurations may include new or reconfigured cells, other network configuration changes, and new network features. Changes in the physical environment may include new roads or buildings.

TABLE 1

| cell0_t0 | cell0_t99 | cell1_t0 | cell1_t99 | cell2_t0 | cell2_t99 | CQI | Timing Advance | Throughput_BLERtarget = 0.05 . . . | Throughput_BLERtarget = 0.9 . . . |
|---|---|---|---|---|---|---|---|---|---|
| . . . | . . . | . . . | . . . | . . . | . . . | | | | |
| 0.1 | 0.2 | 0.5 | 0.6 | 0.1 | 0.2 | 24.88 | 74.23 | 7.23 | 4.79 |

Figure 8:
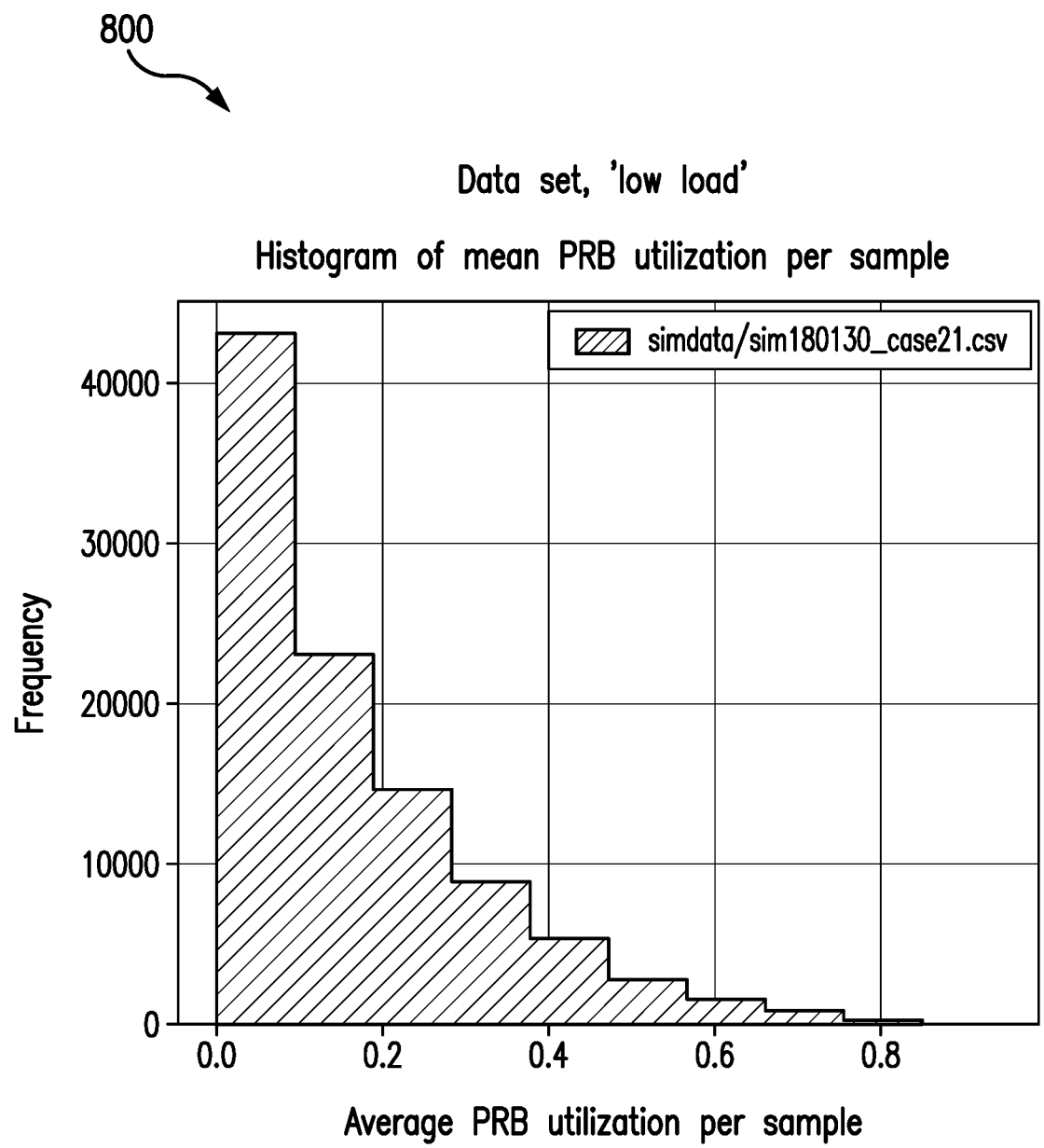
FIGS. 8-9 show a variation of input data according to some embodiments.
Figure 9:
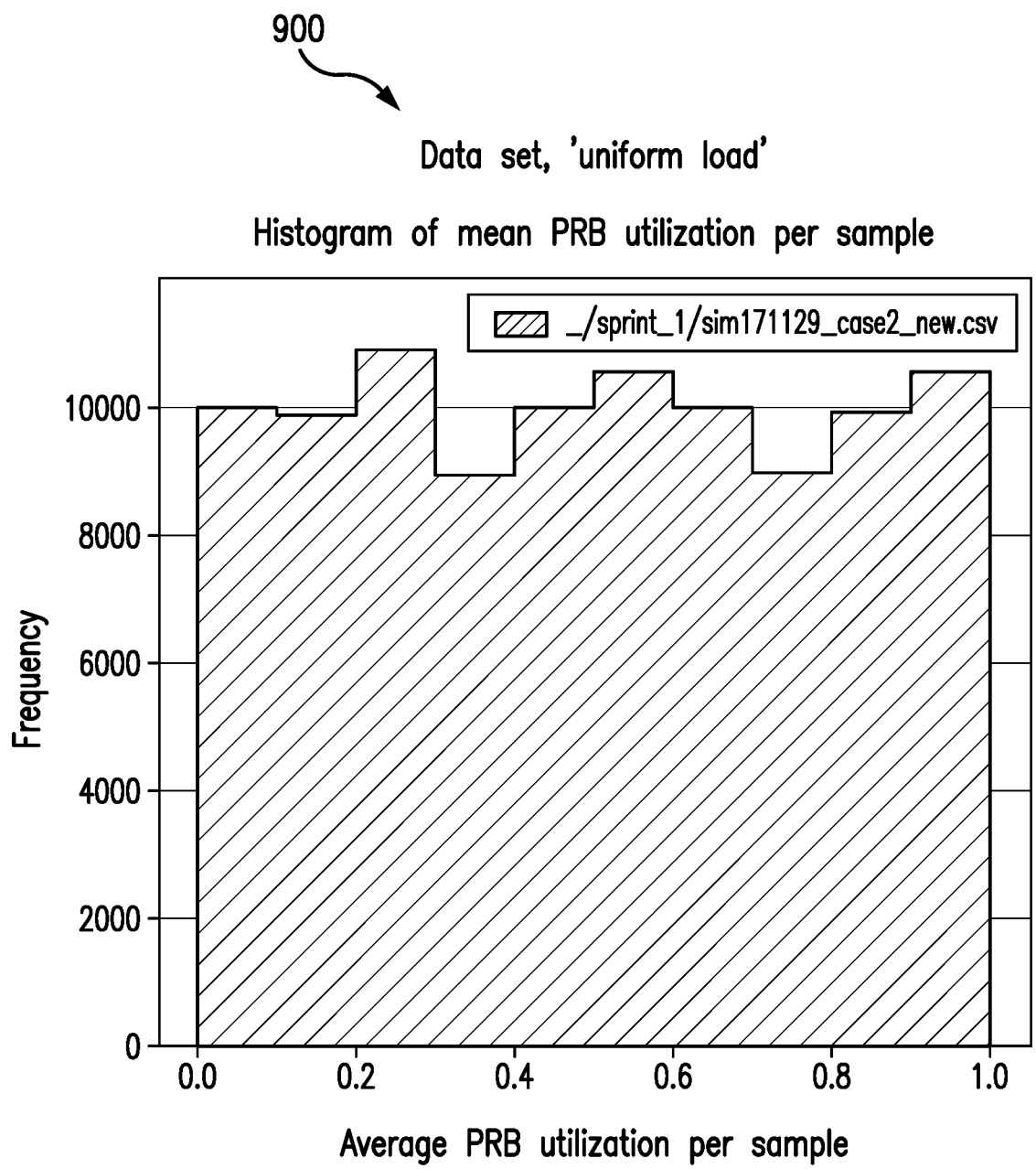

Two data sets were selected to simulate variations in interference. As shown in FIG. 8, the first data set has a "low load" that may represent a cell in a rural area with less neighboring UEs or during off peak hours in a cell located in a dense area. As shown in FIG. 9, the second data set with a "uniform load" was used to simulate a cell with a mix of high and low load. The cell depicted by the second data set may be located in a city.

FIGS. 8-9 show results for the target cell for simulated neighbor cells activity. As shown in FIG. 8-9, Physical Resource Block (PRB) utilization is normalized to a value between 0 and 1. In the example shown in FIGS. 8-9, three neighbor cells have been simulated. The first histogram 800 shows a mainly low load in the first data set with the "low load" and the second histogram 900 shows that there is a mix of high and low load in the second data set with "uniform load."

As described above, the online ML method utilizes a bandit and the tradeoff that the bandit faces at each trial Evaluation of the Online ML Method A number of experiments were performed to evaluate the online ML method disclosed herein. The cold start was used to evaluate how the online ML method behaves at an initial start, i.e. the first time the online ML method is used for a cell in a specific RBS. A cold start means that a ML model has random weights from the beginning.

Using the cold start, the online ML method has been evaluated against a base line and an optimal selection. In some embodiments, the base line is to always use a static value of the BLER target. For example, a BLER target 10% was used in this evaluation. The optimal selection is also referred to as the genie and is derived by always selecting the BLER target that results in the highest SE.

Figure 10:
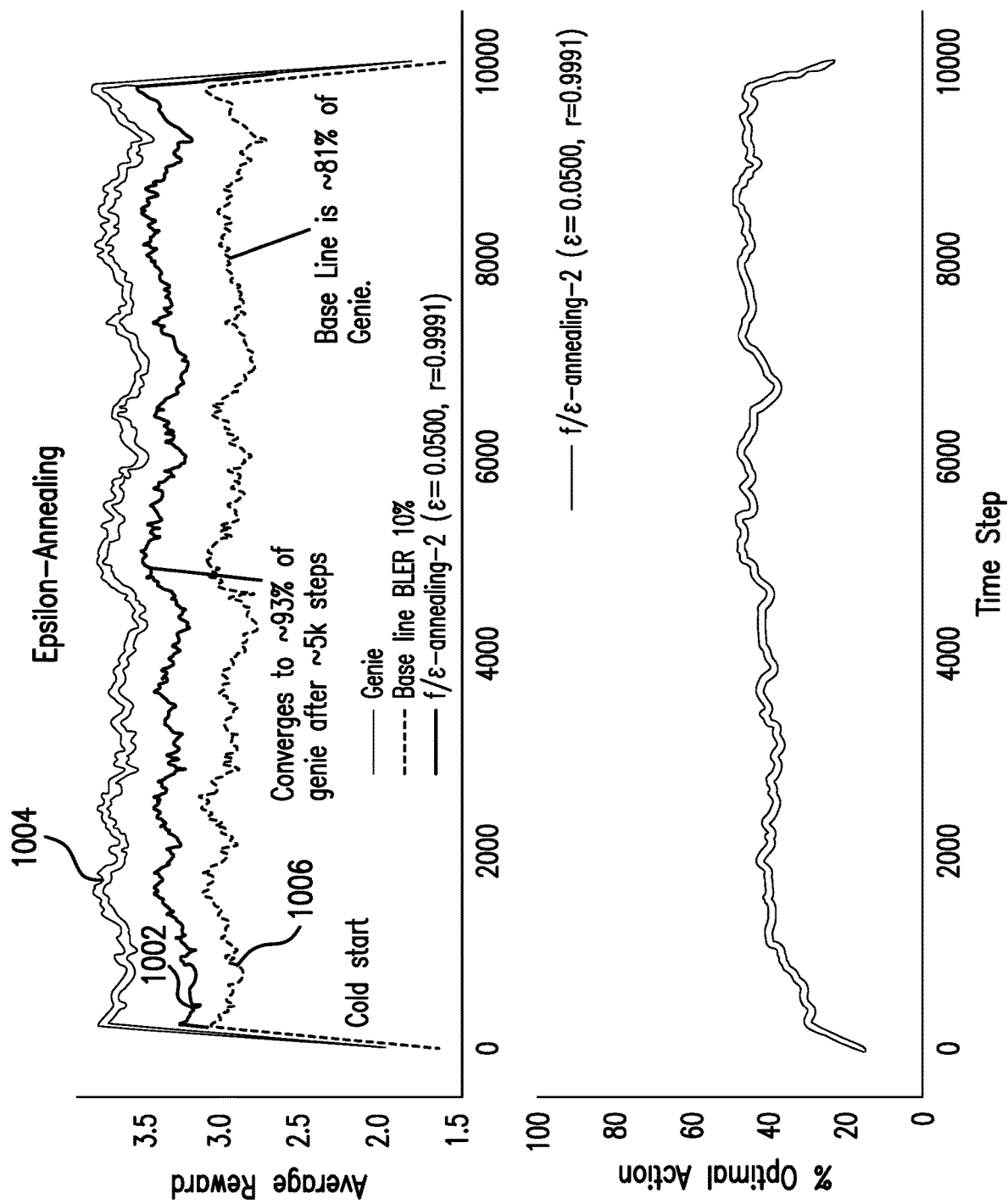
FIGS. 10-13 show test results according to some embodiments.

FIG. 10 shows the results from a test with the data set with uniform load. f/epsilon annealing-2 1002 indicates the results from the contextual bandit algorithm, as shown in FIG. 10.

The results show that, although a cold start has been used, the online method 1002 is better than the base line 1006 only after a few steps and converges to 93% of the optimal selection 1004. Additional results are shown below:

Average Fraction optimal: 0.41
Average score contextual bandit algorithm: 3.34
Average genie score: 3.66
Average base line reward: 2.93

Figure 11:
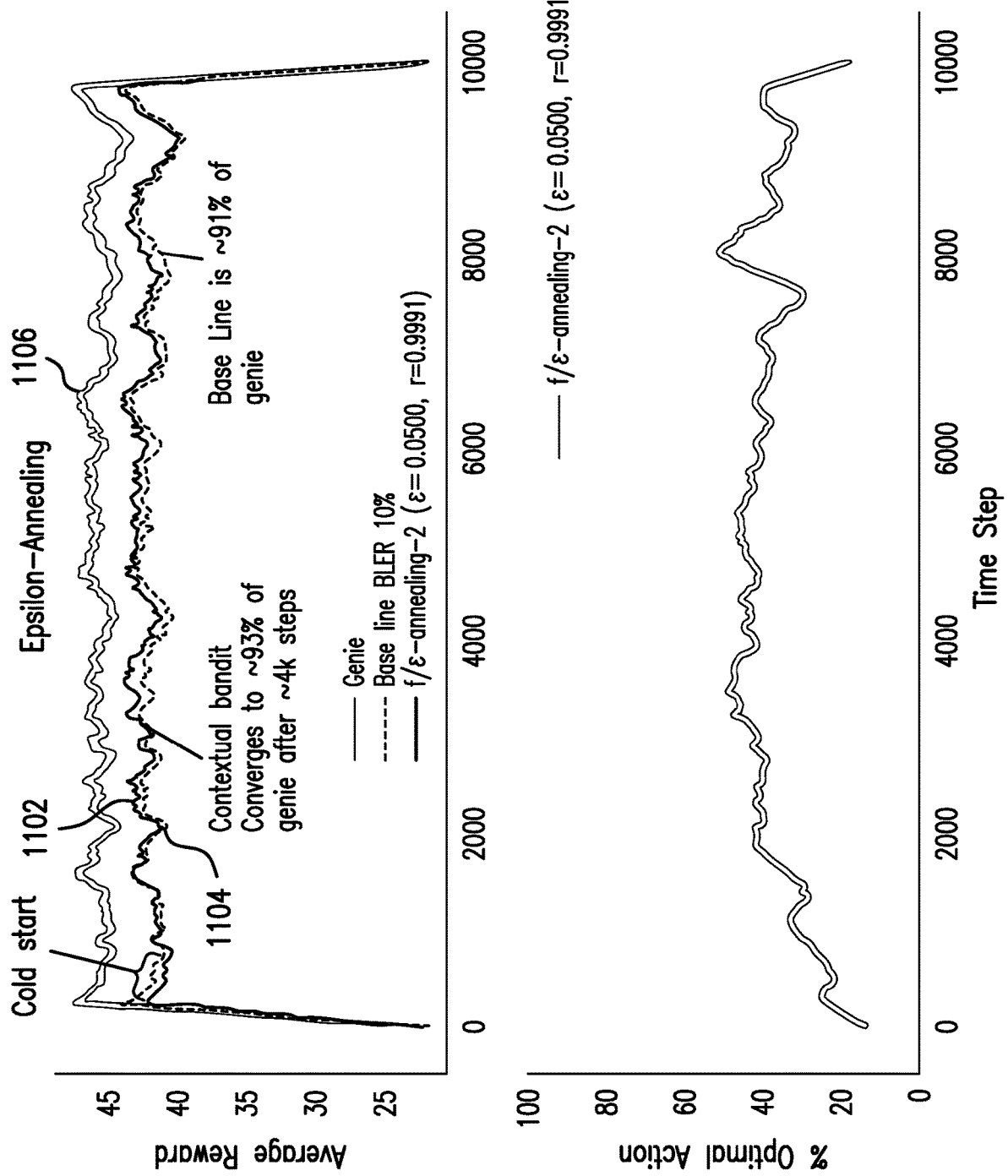

FIG. 11 shows the results from a test with the data set with low load. In this case, the contextual bandit algorithm, as indicated by f/epsilon annealing-2 1102, performs only slightly better than the base line 1104 with the exception of a few initial steps (<1000) due to the cold start. This result is expected since the base line 1104 with a BLER target of 10% is expected to perform well for a continuous low load. Additional results are shown below:

Average Fraction optimal: 0.38
Average score contextual bandit algorithm: 4.24
Average genie score: 4.57
Average base line reward: 4.2

Both FIGS. 10 and 11 are filtered with rectangular sliding window of length 200.

In summary, the results shown in FIGS. 10 and 11 demonstrate that the contextual bandit algorithm (the online ML method) outperforms the base line on the uniform load data set and that both the base line and the contextual bandit algorithm perform well on the low load data set.

Figure 12:
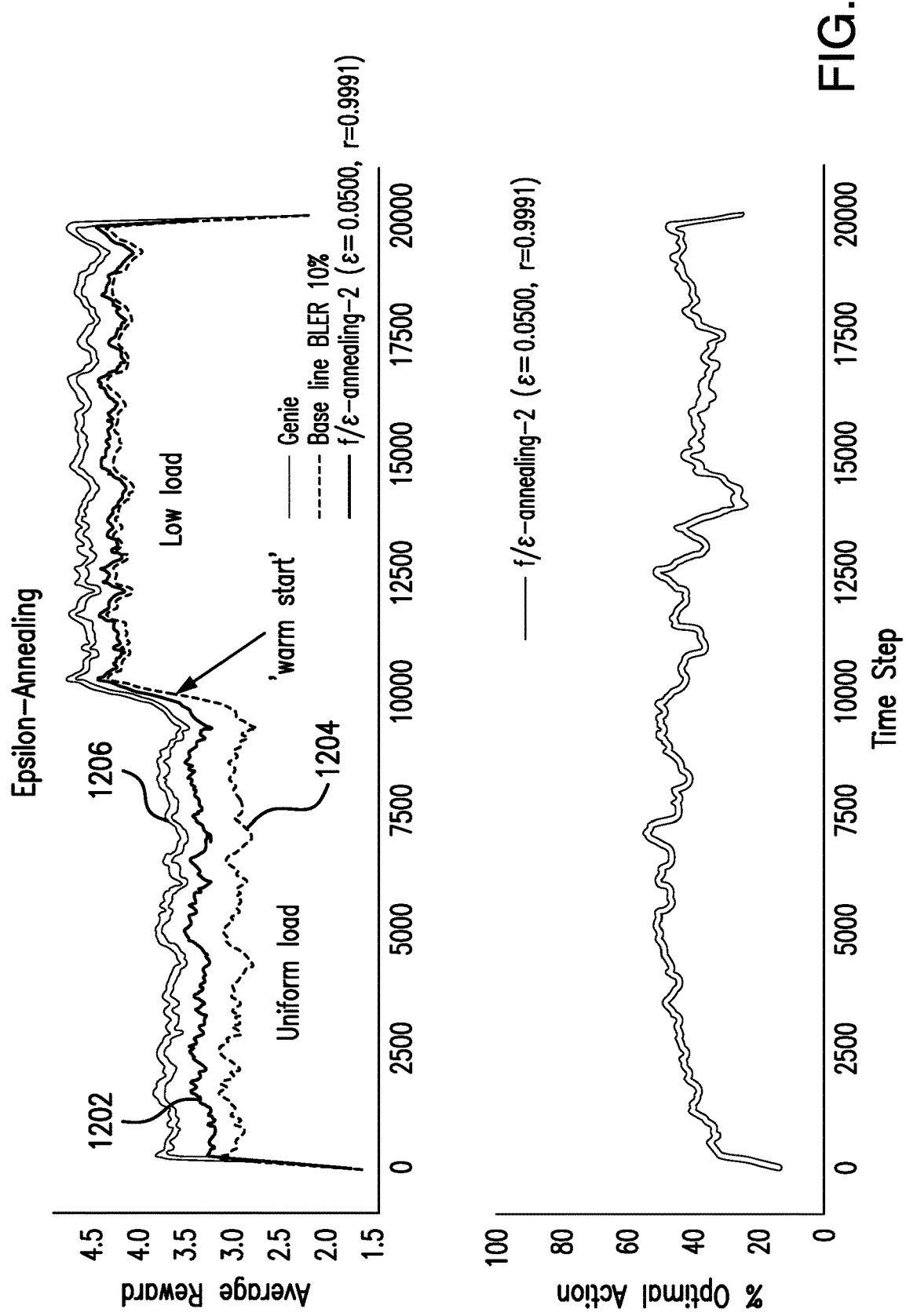

As a further experiment, the two data sets have been merged in order to test how the online ML method performs during concept drift. As shown in FIG. 12, the first 10 k steps from the data set uniform load have been merged with the first and/or last 10 k steps from data set low load where f/epsilon annealing-2 1202 indicates the results from the contextual bandit algorithm.

As shown in FIG. 12, the online ML model has been trained on the environment from the first data set and then the environment is switched to the second data set. Accordingly, it is proven that the online ML model is able to manage concept drifts with minimal impact.

When the second data set is implemented, the MLP model used for the first data set is used as starting values (also referred to as a "warm start"). The result shows that the warm start helps to avoid problem caused by the cold start problems noted above with reference to FIG. 11. With the warm start, as shown in FIG. 12, the online ML model reward 1202 is already higher than the base line 1204 reward from the start. Accordingly, this indicates that the online ML model may be recommended to use warm start parameters when implemented in a product.

Figure 13:
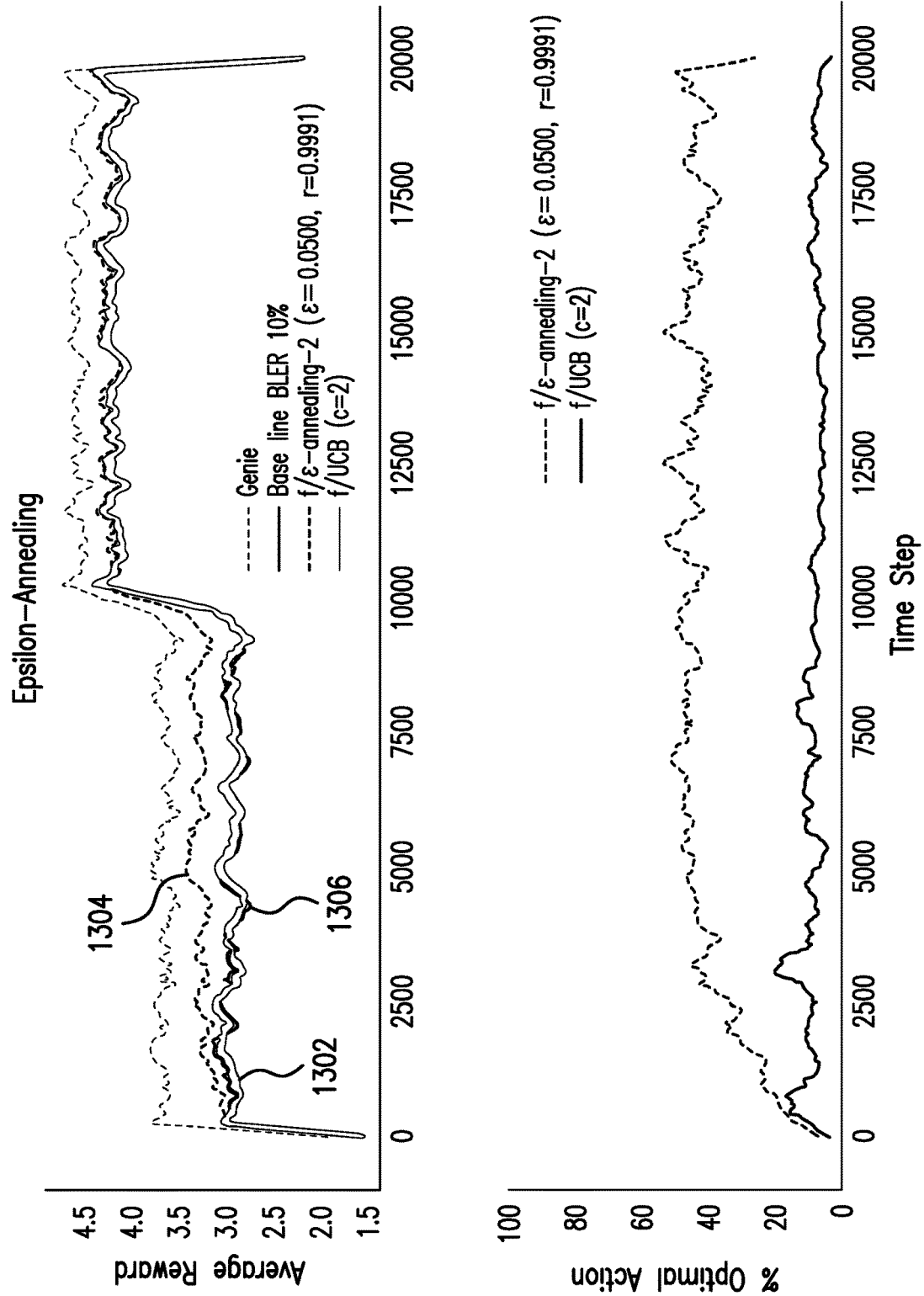

As a further experiment, the online ML model has been compared with a stochastic Multi Armed Bandit (MAB) (also referred to as a non-contextual bandit algorithm) and the results are shown in FIG. 13. f/epsilon annealing-2 1304 indicates the result from the contextual bandit algorithm.

Stochastic MABs are simpler bandits. The stochastic MAB assumes that the context does not impact the reward. Since the SE is expected to be impacted by neighbor cell interference, CQI, TA, and path gain, the results shown in FIG. 13 illustrates that the stochastic MABs 1302 perform worse than the contextual bandit algorithm 1304. Rather, the results show that the stochastic MABs 1302 perform closer to the base line 1306. The Upper Confidence Bound (UCB) bandit has been used for the evaluation since it has shown the best performance of stochastic MABs in previous tests.

In each of the tests, the online ML model embodiment shown in FIG. 1 has been used and a new BLER target is selected every 100 ms. As shown in FIG. 1, seven BLER targets 5%-90% are used with one arm and one MLP per BLER target in the online ML model. Each MLP has 3-layers and 32 neurons per layer. In some embodiments, the online ML model includes one MLP for the seven BLER targets. In some embodiments, the online ML model includes an associated BLER target output for each of the seven MLPs.

The results show that the contextual bandit algorithm disclosed herein (the online ML method) converges to ~93% of the SE for optimal selection (genie) for both data sets. In some instances, the contextual bandit algorithm sometimes gives a worse performance, during start-up phase of the RBS, than base line due to a cold start. This comparatively worse performance happens only once when an RBS is initially started and only the first UEs entering the cell are impacted. As noted above, the problems stemming from the cold start may be resolved by using a warm start.

Accordingly, the results show that online ML model as disclosed herein provides performance almost as good as if the UE was always selecting the optimal BLER target.

Evaluation of the Supervised ML Method

The performance of the supervised ML method has also been evaluated using computer simulations. Specifically, the supervised ML model performance in simulations for DL link adaptation has been evaluated and is explained in further detail below.

A simulator for DL link adaptation for LTE or NR has been used to generate input and output data sets for the ML model training. Again referring to FIG. 7, the chosen simulation scenario is modeling a UE 710 with large amount of DL traffic from a first cell 705 where the UE 710 experiences rapidly varying inter-cell interference from neighbor cells 715*a-e* transmitting data to UEs in short bursts. It is assumed that the domain of possible BLER targets is limited to a finite set $\{BLER_1, BLER_2, \ldots, BLER_K\}$.

As shown in FIG. 7, the first cell 705 is modeled in detail with basic DL link adaptation operating in a fading radio channel. The first cell 705 has a number of neighbor cells ("interferers") 715*a-e* placed in a grid as shown in FIG. 7. Each neighbor 715*a-e* cell transmits an interfering signal with a certain probability at each transmission period causing further dips in the signal quality in the first cell 705. The network 700 shown in FIG. 7 may be an LTE and/or a NR network according to some embodiments.

The UE 710 with a large amount of DL traffic is randomly placed in the cell 705 and data transmissions are simulated for a predetermined time period (e.g., 2-4 seconds). In a single simulation experiment, one data input and output sample is generated by logging the required model input and output measurements as time series. The simulation experiment is repeated a large number of times (e.g., 100000-1000000 times). A new random position for the UE 710 is chosen for each simulation experiment.

Figure 14:
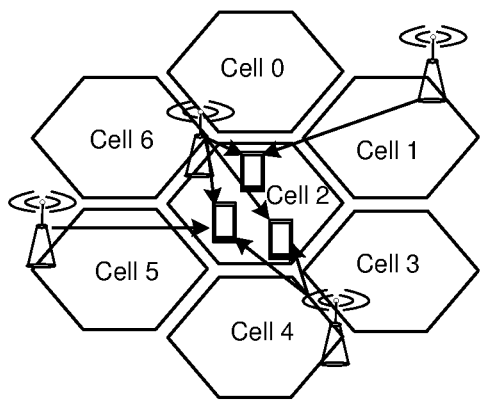
FIG. 14 shows training data collection for a supervised Machine Learning model with a finite set of BLER targets according to one embodiment.
Figure 14:
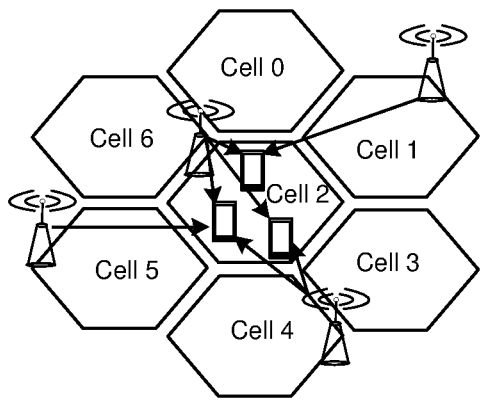
Figure 14:
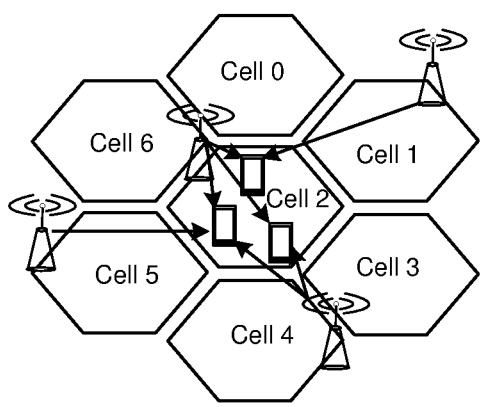

Each simulation experiment is repeated for each of the BLER targets in the set of BLER targets with the UE 710 placed at the same random position and experiencing the same interference pattern. Accordingly, one round of simulation experiments produces a set of transmission performance measurements, e.g. Spectral Efficiency: $\{SE(BLER_1), SE(BLER_2), \ldots, SE(BLER_K)\}$ corresponding to the ML model output, as shown in FIG. 14. The experiment inputs for the simulation includes deployment, traffic model, and random seed. For each of the experiments with BLER (1), BLER(2), up to BLER(N), the model inputs include CQI, neighbor cell activity, TA, and path gain and the model outputs for each respective experiment is the spectral efficiency, e.g., spectral efficiency of BLER(1), spectral efficiency of BLER(2), etc.

Given the data obtained from the simulation experiments, the generated input and output data sets are used to train a ML model (or a plurality of ML models) using a supervised learning procedure. Finally, the ML model performance is evaluated in terms of the prediction accuracy.

With respect to the parameters for the simulation experiments, the simulated scenario models a cell with a mix of high and low loads, where all load values occur almost equally. That is, the load is approximately uniformly distributed, as indicated by the histogram shown in FIG. 9 of Physical Resource Block (PRB) utilization in the cell 705.

The finite set of possible BLER targets are provided by the set {0.05, 0.1, 0.2, 0.3, 0.5, 0.7, 0.9}. A 3-layer neural network with multiple outputs (which may also be referred to as a neural network with two hidden layers), as shown in FIG. 5, has been used as the ML model and each output is a predicted spectral efficiency for each corresponding BLER target.

The inputs for ML model were provided as follows: (1) mean and standard deviation for PRB utilization for three neighbor cells; mean signal to noise ratio (SINR); distance to the serving eNodeB; and pathgain to the serving cell.

Finally, the ML model had been trained on 100,000 simulated input and output samples.

Figure 15:
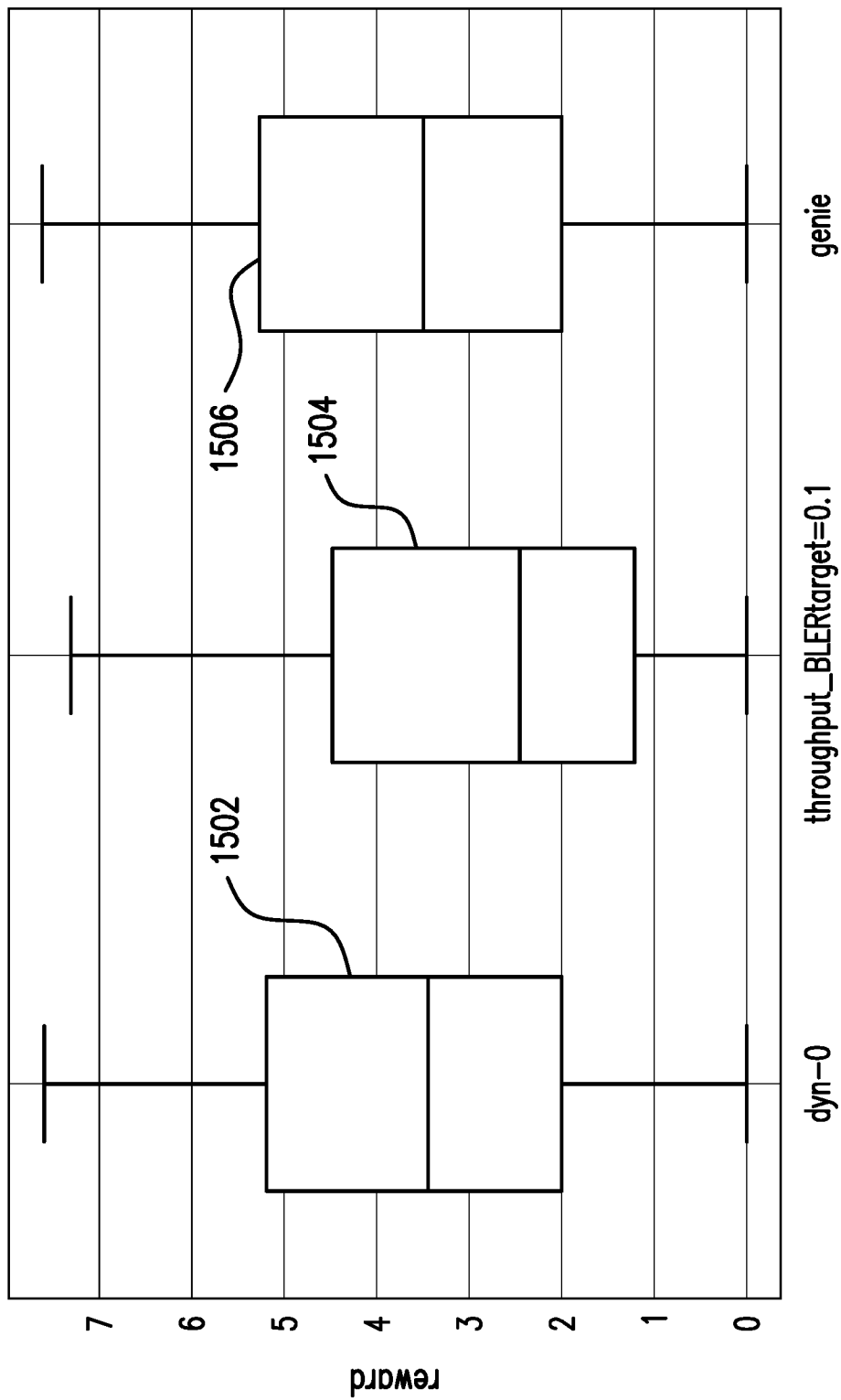
FIG. 15 shows box plots for distributions of spectral efficiency according to some embodiments.
Figure 16:
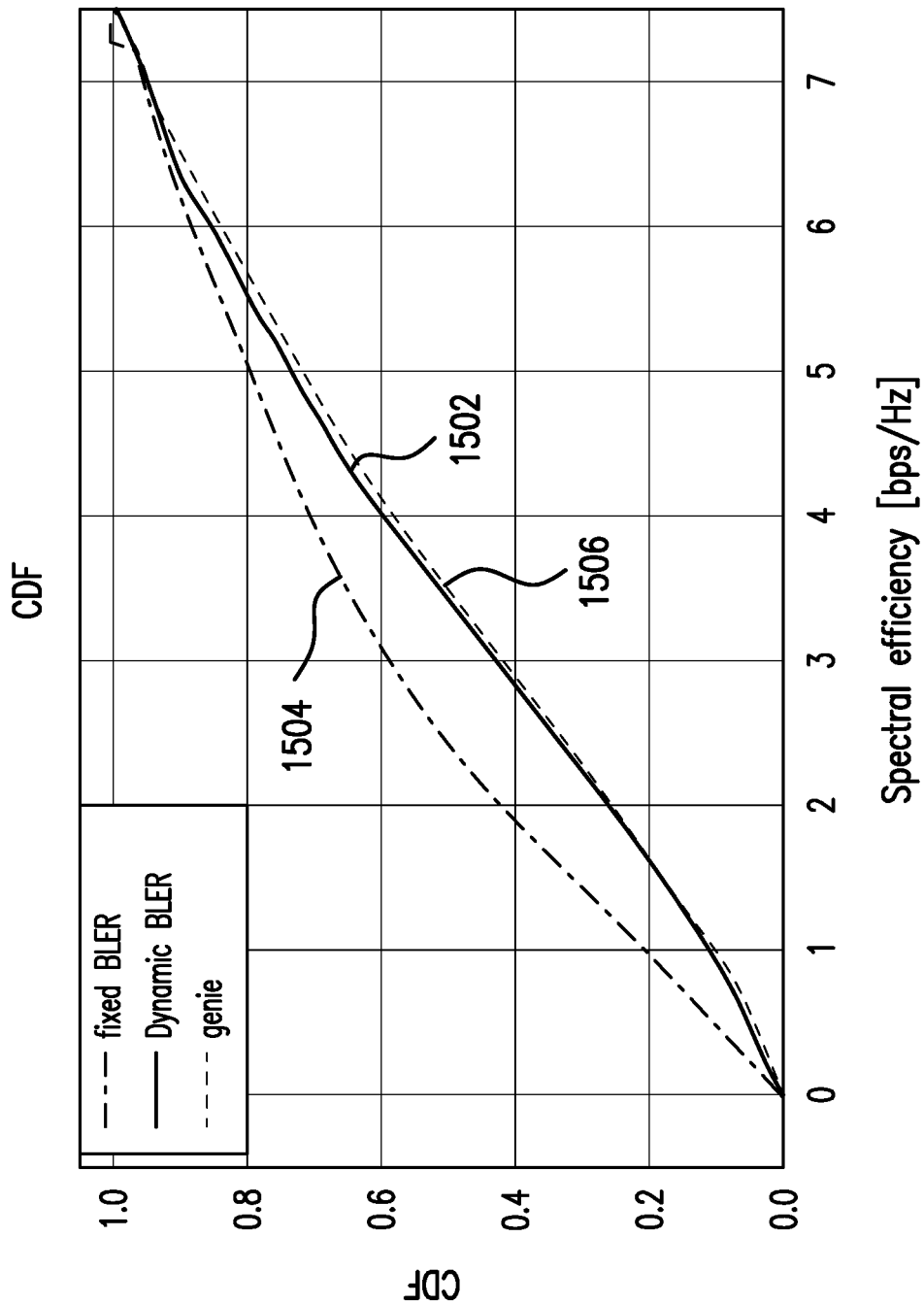
FIG. 16 shows CDF plots for distributions of spectral efficiency according to some embodiments.

FIGS. 15 and 16 show the observed distributions for spectral efficiency for the UE experiencing rapidly varying inter-cell interference with three different link adaptation algorithms. The first algorithm 1502 uses dynamic BLER target selected with the ML model, the second algorithm 1504 uses a fixed 10% BLER target and the third algorithm 1506, hereafter referred to as the "genie" algorithm, is a full-tree search algorithm setting the optimal BLER target from the given finite set. FIG. 15 shows box plots for the distributions and FIG. 16 shows CDF plots. FIG. 15 shows observed distributions for spectral efficiency for three link adaptation algorithms: dynamic BLER selected with the ML model (1502), fixed 10% BLER (1504), and the best possible dynamic BLER target from the considered finite set (1506). FIG. 16 shows the observed CDF for spectral efficiency for three link adaptation algorithms: dynamic BLER selected with the ML model (1502), fixed 10% BLER (1504), and the best possible dynamic BLER target from the considered finite set (1506).

The full-tree "genie" search algorithm 1506 shows the highest possible potential of replacing static BLER target by a dynamic one, but cannot be implemented in the reality. It requires knowing all possible spectral efficiency outcomes for all chosen BLER target values, which is only possible in simulation experiments. In reality, only one spectral efficiency outcome corresponding to the chosen BLER value is known.

By comparing the estimated mean values from the box plots in FIG. 15, it can be observed that the available potential for setting BLER target dynamically with the "genie" full-tree search algorithm 1506 may be up to 40% spectral efficiency gain on average. Deploying dynamic BLER target set by a ML model 1502 is almost as good as the "genie" algorithm 1506 and yields up to 36% spectral efficiency gain on average.

By further inspecting the CDF plots in FIG. 16, it can be seen that dynamic BLER target selected with the ML model 1502 yields higher spectral efficiency than fixed 10% BLER target 1504 in most load cases. Up to 30% gains in spectral efficiency can be achieved for certain loads. Also, performance of dynamic BLER target selected with the ML model is very close to the best optimal one achieved by the "genie" algorithm 1506.

Figure 17:
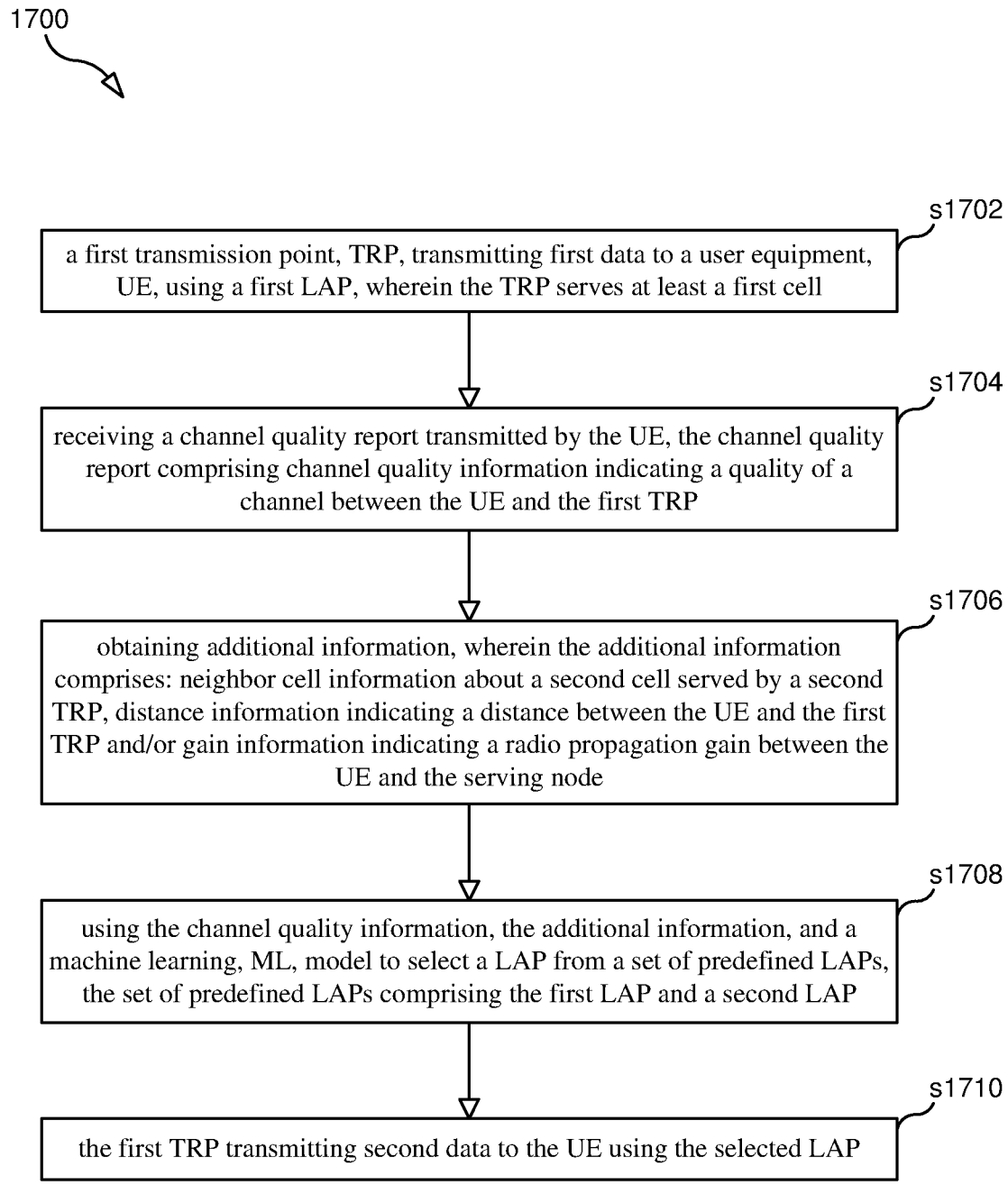
FIG. 17 is a flow chart illustrating a process according to one embodiment.

FIG. 17 is a flow chart illustrating a process 1700, according to some embodiments, that is performed in a communication network for dynamically selecting a link adaptation policy, LAP. Process 1700 may begin with step s1702 in which a first transmission point, TRP, transmits first data to a user equipment, UE, using a first LAP, wherein the first TRP serves at least a first cell. In step s1704, a channel quality report transmitted by the UE is received, wherein the channel quality report comprises channel quality information indicating a quality of a channel between the UE and the first TRP. In step s1706, additional information is obtained, wherein the additional information comprises: neighbor cell information about a second cell served by a second TRP, distance information indicating a distance between the UE and the first TRP (e.g., a timing advance, TA, indicator transmitted by the UE), and/or gain information indicating a radio propagation gain between the UE and the serving node (e.g., an average gain). In step s1708, a LAP is selected from a set of predefined LAPs using the channel quality information, the additional information, and a machine learning, ML, model. In some embodiments, the set of predefined LAPs comprising the first LAP and a second LAP. In step s1710, the first TRP transmits second data to the UE using the selected LAP.

In some embodiments, the selected LAP indicates a block error rate (BLER) target and transmitting the second data to the UE using the selected LAP comprises transmitting the second data to the UE using the BLER target.

In some embodiments, transmitting the second data to the UE using the BLER target comprises selecting a transport block size, TBS, based on the BLER target and transmitting the second data to the UE using the selected TBS.

In some embodiments, the process 1700 includes generating the ML model, wherein generating the ML model comprises providing training data to an ML algorithm.

In some embodiments, selecting LAP from the set of predefined LAPs further comprises determining a first reward associated with the first LAP; determining a second reward associated with the second LAP; and determining a third reward associated with a third LAP, wherein the set of predefined LAPs further comprises the third LAP.

In some embodiments, selecting the LAP from the set of predefined LAPs comprises performing a first binomial (e.g., Bernoulli) trial, wherein a result of the first binomial trial consists of a first outcome or a second outcome, a first probability is assigned to the first outcome, and a second probability is assigned to the second outcome.

In some embodiments, selecting the LAP from the set of predefined LAPs further comprises selecting the first reward, the second reward or the third reward based on the result of the first binomial trial, thereby selecting the first LAP associated with the first reward, the second LAP associated with the second reward or the third LAP associated with the third reward.

In some embodiments, selecting the first reward, the second reward or the third reward based on the result of the first binomial trial comprises selecting the first reward when the result of the first binomial trial is the first outcome (exploitation mode); and randomly selecting the second reward or the third reward when the result of the first binomial trial is the second outcome (exploration mode), wherein the first reward is higher than the second reward and the third reward.

In some embodiments, selecting the LAP from the set of predefined LAPs further comprises performing a second binomial trial, wherein a result of the second binomial trial consists of the first outcome or the second outcome, and wherein performing the second binomial trial comprises obtaining an annealing probability value; increasing the first probability by the annealing probability value to obtain an updated first probability; reducing the second probability by the annealing probability value to obtain an updated second probability; assigning the updated first probability to the first outcome; and assigning the updated second probability to the second outcome.

In some embodiments, selecting the LAP from the set of predefined LAPs further comprises selecting the first reward, the second reward or the third reward based on the result of the second binomial trial, thereby selecting the first LAP associated with the first reward, the second LAP associated with the second reward or the third LAP associated with the third reward.

In some embodiments, the first reward comprises a first spectral efficiency, the second reward comprises a second spectral efficiency, and the third reward comprises a third spectral efficiency.

In some embodiments, the process 1700 includes providing training data to the ML algorithm based on the transmitted second data to the UE using the selected LAP.

In some embodiments, the additional information further comprises neighbor cell information about a third cell served by a third TRP.

In some embodiments, selecting the LAP from the set of predefined LAPs comprises utilizing an epsilon-greedy arm selection algorithm, an upper confidence bounds (UCB) algorithm, and/or a Thompson sampling algorithm.

Figure 18:
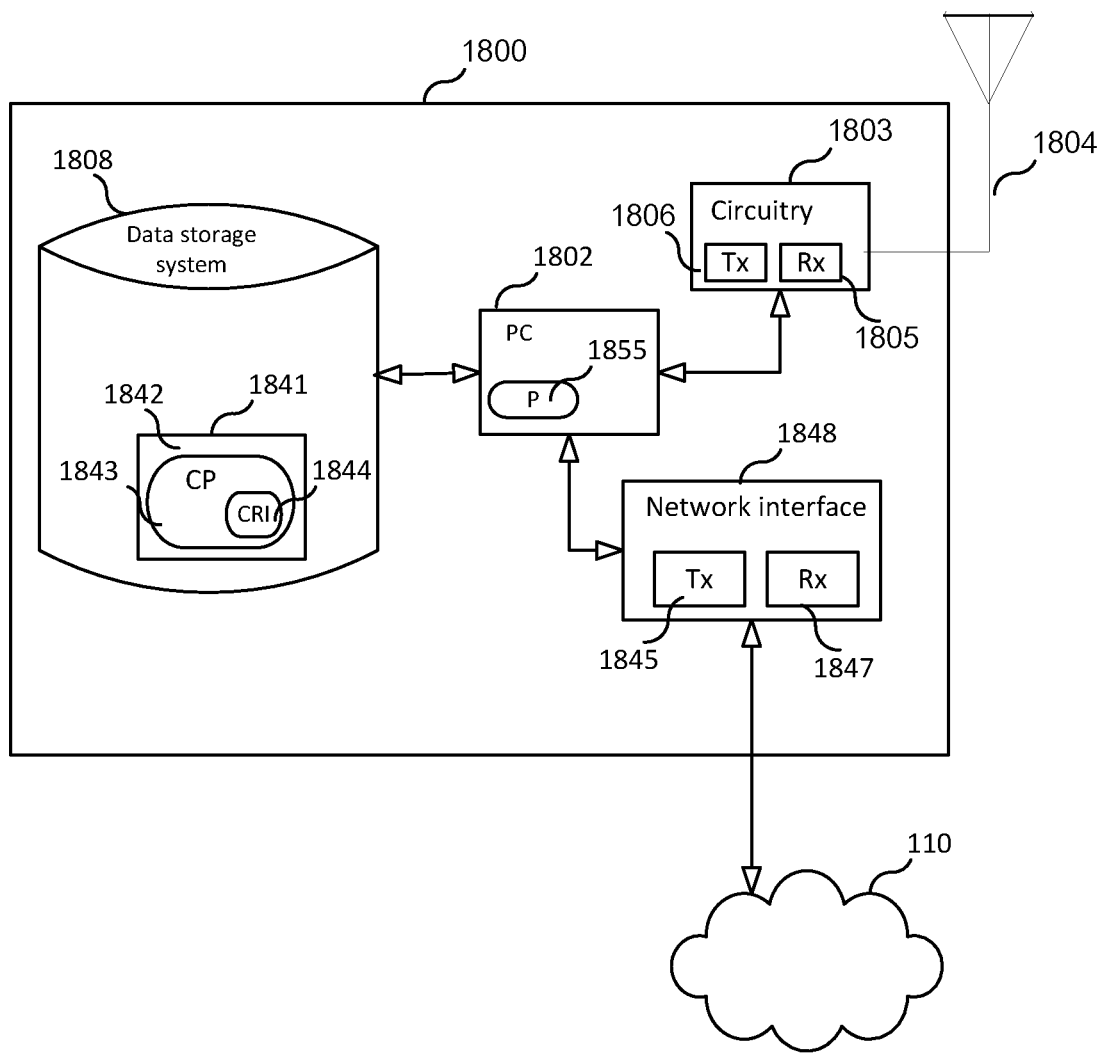
FIG. 18 is a block diagram of a transmission point according to one embodiment.

FIG. 18 is a block diagram of TRP 1800 according to some embodiments. In some embodiments, the TRP 1800 may be a base station (e.g., RBS) or a component of a base station. In some embodiments, a base station may comprise one or more TRPs. As shown in FIG. 18, TRP 1800 may comprise: a processing circuit (PC) 1802, which may include one or more processors (P) 1855 (e.g., a general purpose microprocessor and/or one or more other processors, such as an application specific integrated circuit (ASIC), field-programmable gate arrays (FPGAs), and the like) which processors may be co-located or distributed across different locations; a network interface 1848 comprising a transmitter (Tx) 1845 and a receiver (Rx) 1847 for enabling TRP 1800 to transmit data to and receive data from other nodes connected to a network 110 (e.g., an Internet Protocol (IP) network) to which network interface 1848 is connected; circuitry 1803 (e.g., radio transceiver circuitry comprising an Rx 1805 and a Tx 1806) coupled to an antenna system 1804 for wireless communication with UEs); and local storage unit (a.k.a., "data storage system") 1808, which may include one or more non-volatile storage devices and/or one or more volatile storage devices (e.g., random access memory (RAM)). In embodiments where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, but not limited to, magnetic media (e.g., a hard disk), optical media, memory devices (e.g., random access memory, flash memory), and the like. In some embodiments, the CRI 1844 of computer program 1843 is configured such that when executed by data processing apparatus 1802, the CRI causes TRP 1800 to perform steps described herein (e.g., steps described herein with reference to the flow charts and/or message flow diagrams). In other embodiments, TRP 1800 may be configured to perform steps described herein without the need for code. That is, for example, PC 1802 may consist merely of one or more ASICs. Hence, the features of the embodiments described herein may be implemented in hardware and/or software.

In some embodiments, software packages for ML may be used to implement the ML models disclosed herein. For example, software packages provided by Python, Tensorflow, Keras, Scikit-learn, deeplearning4j, Pytorch, Caffe, MXnet, and Theano may be used to implement the ML models disclosed herein.

Figure 19:
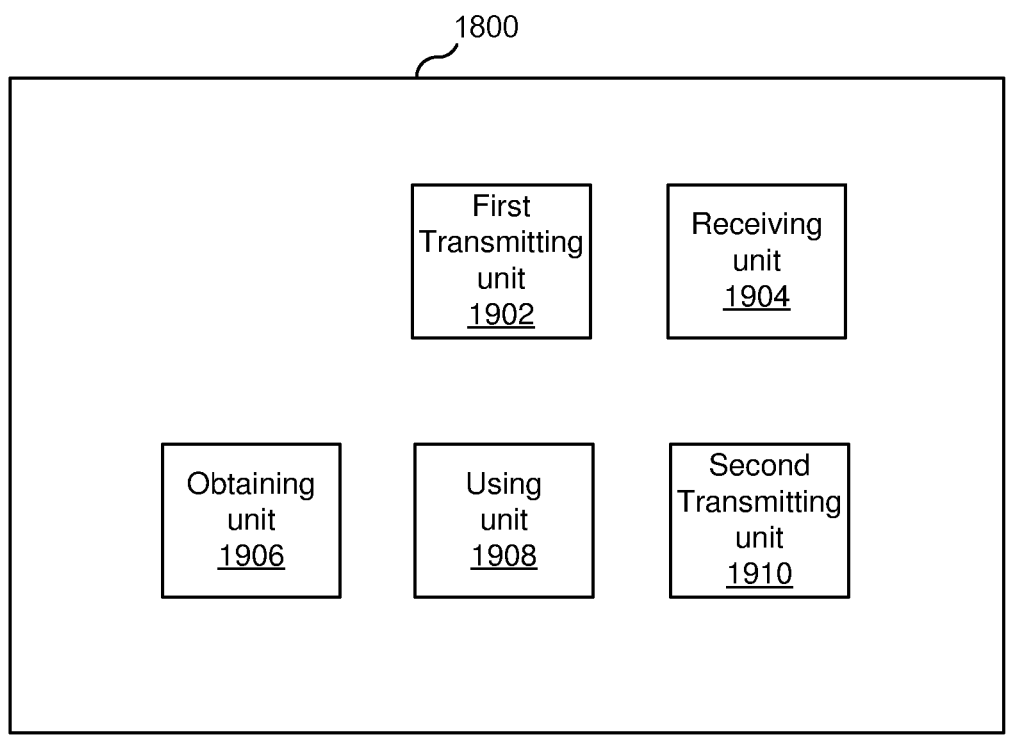
FIG. 19 is a diagram showing functional units of a transmission point according to one embodiment.

FIG. 19 is a diagram showing functional units of TRP 1800 according to some embodiments. As shown in FIG. 19, TRP 1800 includes a first transmitting unit 1902 for transmitting first data to a user equipment, UE, using a first LAP, wherein the first TRP serves at least a first cell; a receiving unit 1904 for receiving a channel quality report transmitted by the UE, the channel quality report comprising channel quality information indicating a quality of a channel between the UE and the first TRP; an obtaining unit 1906 for obtaining additional information, wherein the additional information comprises: neighbor cell information about a second cell served by a second TRP, distance information indicating a distance between the UE and the first TRP (e.g., a timing advance, TA, indicator transmitted by the UE), and/or gain information indicating a radio propagation gain between the UE and the serving node (e.g., an average gain); a using unit 1908 for using the channel quality information, the additional information, and a machine learning, ML, model to select a LAP from a set of predefined LAPs, the set of predefined LAPs comprising the first LAP and a second LAP; and a second transmitting unit 1910 for transmitting second data to the UE using the selected LAP.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for dynamically selecting a link adaptation policy (LAP), the method comprising:
   a first transmission point (TRP) transmitting first data to a user equipment (UE) using a first LAP, wherein the first TRP serves at least a first cell;
   receiving a channel quality report transmitted by the UE, the channel quality report comprising channel quality information indicating a quality of a channel between the UE and the first TRP;
   obtaining additional information, wherein the additional information comprises: neighbor cell information about a second cell served by a second TRP, distance information indicating a distance between the UE and the first TRP, and/or gain information indicating a radio propagation gain between the UE and the serving node;
using the channel quality information, the additional information, and a machine learning (ML) model to select a LAP from a set of predefined LAPs, the set of predefined LAPs comprising the first LAP and a second LAP; and
the first TRP transmitting second data to the UE using the selected LAP, wherein
selecting the LAP from the set of predefined LAPs comprises:
determining a first reward associated with the first LAP; and
determining a second reward associated with the second LAP.

2. A non-transitory computer readable medium storing a computer program comprising instructions which, when executed by processing circuitry of a device, causes the device to carry out the method of claim 1.

3. A first transmission point (TRP) configured to dynamically select a link adaptation policy (LAP), the first TRP adapted to:
transmit first data to a user equipment (UE) using a first LAP, wherein the first TRP serves at least a first cell;
receive a channel quality report transmitted by the UE, the channel quality report comprising channel quality information indicating a quality of a channel between the UE and the first TRP;
obtain additional information, wherein the additional information comprises: neighbor cell information about a second cell served by a second TRP, distance information indicating a distance between the UE and the first TRP, and/or gain information indicating a radio propagation gain between the UE and the serving node;
use the channel quality information, the additional information, and a machine learning (ML) model to select a LAP from a set of predefined LAPs, the set of predefined LAPs comprising the first LAP and a second LAP; and
transmit second data to the UE using the selected LAP, wherein
selecting the LAP from the set of predefined LAPs comprises:
determining a first reward associated with the first LAP; and
determining a second reward associated with the second LAP.

4. The first TRP of claim 3, wherein
the selected LAP indicates a block error rate (BLER) target, and
transmitting the second data to the UE using the selected LAP comprises transmitting the second data to the UE using the BLER target.

5. The first TRP of claim 4, wherein transmitting the second data to the UE using the BLER target comprises selecting a transport block size (TBS) based on the BLER target and transmitting the second data to the UE using the selected TBS.

6. The first TRP of claim 3, further comprising:
generating the ML model, wherein generating the ML model comprises providing training data to an ML algorithm.

7. The first TRP of claim 6, further comprising:
providing training data to the ML algorithm based on the transmitted second data to the UE using the selected LAP.

8. The first TRP of claim 3, wherein selecting the LAP from the set of predefined LAPs further comprises:
determining a third reward associated with a third LAP, wherein
the set of predefined LAPs further comprises the third LAP.

9. The first TRP of claim 3, wherein selecting the LAP from the set of predefined LAPs comprises:
performing a first binomial trial, wherein
a result of the first binomial trial consists of a first outcome or a second outcome,
a first probability is assigned to the first outcome, and
a second probability is assigned to the second outcome.

10. The first TRP of claim 9, wherein selecting the LAP from the set of predefined LAPs further comprises:
selecting the first reward, the second reward or the third reward based on the result of the first binomial trial, thereby selecting the first LAP associated with the first reward, the second LAP associated with the second reward or the third LAP associated with the third reward.

11. The first TRP of claim 10, wherein selecting the first reward, the second reward or the third reward based on the result of the first binomial trial comprises:
selecting the first reward when the result of the first binomial trial is the first outcome; and
randomly selecting the second reward or the third reward when the result of the first binomial trial is the second outcome,
wherein the first reward is higher than the second reward and the third reward.

12. The first TRP of claim 10, wherein selecting the LAP from the set of predefined LAPs further comprises:
performing a second binomial trial, wherein a result of the second binomial trial consists of the first outcome or the second outcome, and wherein performing the second binomial trial comprises:
obtaining an annealing probability value;
increasing the first probability by the annealing probability value to obtain an updated first probability;
reducing the second probability by the annealing probability value to obtain an updated second probability;
assigning the updated first probability to the first outcome; and
assigning the updated second probability to the second outcome.

13. The first TRP of claim 12, wherein selecting the LAP from the set of predefined LAPs further comprises:
selecting the first reward, the second reward or the third reward based on the result of the second binomial trial, thereby selecting the first LAP associated with the first reward, the second LAP associated with the second reward or the third LAP associated with the third reward.

14. The first TRP of claim 9, wherein the first reward comprises a first spectral efficiency, the second reward comprises a second spectral efficiency, and the third reward comprises a third spectral efficiency.

15. The first TRP of claim 3, wherein the additional information further comprises neighbor cell information about a third cell served by a third TRP.

16. The first TRP of claim 3, wherein selecting the LAP from the set of predefined LAPs comprises utilizing an epsilon-greedy arm selection algorithm, an upper confidence bounds (UCB) algorithm, and/or a Thompson sampling algorithm.

* * * * *